(12) United States Patent
Lutz et al.

(10) Patent No.: US 8,295,336 B2
(45) Date of Patent: Oct. 23, 2012

(54) HIGH BANDWIDTH PROGRAMMABLE TRANSMISSION LINE PRE-EMPHASIS METHOD AND CIRCUIT

(75) Inventors: Robert C. Lutz, Sunnyvale, CA (US); Thomas S. Wong, San Jose, CA (US); Klaus P. Piontek, San Jose, CA (US)

(73) Assignee: Micrel Inc., San Jose, CA (US)

( * ) Notice: Subject to any disclaimer, the term of this patent is extended or adjusted under 35 U.S.C. 154(b) by 338 days.

(21) Appl. No.: 12/725,399

(22) Filed: Mar. 16, 2010

(65) Prior Publication Data
US 2011/0228823 A1 Sep. 22, 2011

(51) Int. Cl.
*H04B 1/38* (2006.01)
(52) U.S. Cl. .......... 375/222; 375/258; 375/257
(58) Field of Classification Search .......... 375/222, 375/258, 257
See application file for complete search history.

(56) References Cited

U.S. PATENT DOCUMENTS

| | | | | | |
|---|---|---|---|---|---|
| 3,689,752 | A | * | 9/1972 | Gilbert | 327/357 |
| 4,885,547 | A | * | 12/1989 | Bell et al. | 330/254 |
| 5,124,673 | A | * | 6/1992 | Hershberger | 333/18 |
| 6,111,463 | A | * | 8/2000 | Kimura | 330/254 |
| 6,215,816 | B1 | * | 4/2001 | Gillespie et al. | 375/219 |
| 6,580,760 | B1 | * | 6/2003 | Larsen | 375/257 |
| 6,590,454 | B2 | * | 7/2003 | Phanse et al. | 330/257 |
| 6,724,219 | B1 | * | 4/2004 | Kim et al. | 326/30 |
| 7,042,952 | B1 | * | 5/2006 | Murphy | 375/258 |
| 7,126,419 | B2 | * | 10/2006 | Miyasita | 330/69 |
| 7,280,590 | B1 | * | 10/2007 | Boecker et al. | 375/219 |
| 7,403,041 | B2 | * | 7/2008 | Bajdechi et al. | 326/86 |
| 7,492,827 | B2 | * | 2/2009 | Feldtkeller | 375/258 |
| 7,515,672 | B2 | * | 4/2009 | Dupuis et al. | 375/377 |
| 7,643,563 | B2 | * | 1/2010 | Huang et al. | 375/257 |
| 7,724,815 | B1 | * | 5/2010 | Raha et al. | 375/230 |
| 8,068,537 | B2 | * | 11/2011 | Roth | 375/219 |
| 8,138,851 | B2 | * | 3/2012 | Lutz et al. | 333/81 R |
| 8,149,013 | B2 | * | 4/2012 | Kao | 326/27 |
| 2002/0118732 | A1 | * | 8/2002 | Koren | 375/219 |
| 2002/0181601 | A1 | * | 12/2002 | Huang et al. | 375/258 |
| 2003/0016091 | A1 | * | 1/2003 | Casper | 333/18 |
| 2004/0227622 | A1 | * | 11/2004 | Giannini et al. | 340/310.01 |

(Continued)

OTHER PUBLICATIONS

"10.7Gbps Adaptive Receive Equalizer," Maxim MAX3805 Data Sheet, pp. 1-10, Year: 2006.

*Primary Examiner* — David Ometz
*Assistant Examiner* — Santiago Garcia
(74) *Attorney, Agent, or Firm* — Patent Law Group LLP; Carmen C. Cook

(57) ABSTRACT

A transmission line pre-emphasis circuit includes a primary signal path receiving a digital data stream and generating a primary output current indicative of the digital data stream, one or more secondary signal paths each incorporating a network implementing a specific transient response where the one or more secondary signal paths receive the digital data stream and generate secondary output currents representing one or more overshoot signals indicative of the transient response of the respective network. The one or more secondary signal paths have variable gain being programmed through respective DC programming signals. The secondary output currents are summed with the primary output current. The transmission line pre-emphasis circuit further includes an output loading stage coupled to generate from the summed current a pre-emphasized digital output signal indicative of the one or more overshoot signals added to the digital data stream.

22 Claims, 16 Drawing Sheets

U.S. PATENT DOCUMENTS

| | | | |
|---|---|---|---|
| 2005/0100104 A1* | 5/2005 | Dupuis et al. | 375/257 |
| 2006/0171477 A1* | 8/2006 | Carballo et al. | 375/257 |
| 2007/0014340 A1* | 1/2007 | McGee | 375/220 |
| 2010/0045254 A1* | 2/2010 | Grant | 323/283 |
| 2011/0096848 A1* | 4/2011 | Lam et al. | 375/257 |
| 2011/0227675 A1* | 9/2011 | Lutz et al. | 333/28 R |
| 2011/0228824 A1* | 9/2011 | Lutz | 375/219 |
| 2011/0228871 A1* | 9/2011 | Lutz | 375/295 |
| 2012/0001678 A1* | 1/2012 | Feng | 327/517 |

* cited by examiner

HIGH BANDWIDTH PROGRAMMABLE TRANSMISSION LINE PRE-EMPHASIS METHOD AND CIRCUIT

FIELD OF THE INVENTION

The invention relates to transmission line pre-emphasis circuit and method and, in particular, to a programmable transmission line pre-emphasis circuit and method for use in high bandwidth applications.

DESCRIPTION OF THE RELATED ART

High digital data rates often mandate using properly terminated, controlled impedance paths, called transmission lines, to maintain data integrity. Transmission lines can include a variety of media, such as coaxial cables, twinax cables, as well as single traces and differential pair traces on a PC board such as striplines, microstrip lines and coplanar waveguides. Most of these media exhibit signal loss as the data signal is transmitted over the length of the transmission line and that signal loss increases with line length and signal harmonic frequencies. That is, the higher frequency components of the data signal being carried is more susceptible to signal loss for long line length. Because the high frequency components of a digital bit stream defines the transition edges of the data signal, losing the high frequency components of the data signal results in distortion. Severe distortion can introduce errors into the received bit stream.

A transmission line equalizer is employed as an end-of-line receiver to selectively boost the higher signal harmonics or higher frequency components of the signal to compensate for frequency dependent losses, thus helping to restore the digital bit stream to the original data stream. In some instances, the limit of equalization is reached and equalization alone cannot fully recover the original data stream and other compensation methods are desired. Pre-emphasis is one method of compensation wherein the signal to be transmitted is modified at the driver end so that the signal includes signal transitions designed to overshoot in a controlled fashion. In practice, pre-emphasis works by boosting the higher frequency components that are going to be attenuated at the receiver end of the transmission line. In this manner, the frequency components that are susceptible to signal loss are strengthened before the digital bit stream is transmitted down the transmission line. Though pre-emphasis exaggerates and distorts signals at the driver end, proper implementations improve signal readability at the receiver end of the transmission line.

SUMMARY OF THE INVENTION

According to one embodiment of the present invention, a transmission line pre-emphasis circuit includes a primary signal path coupled to receive a digital data stream to be transmitted and provide a primary output current indicative of the digital data stream to a pair of current summing nodes, one or more secondary signal paths each incorporating a network implementing a specific transient response where the one or more secondary signal paths receive the digital data stream and generate secondary output currents representing one or more overshoot signals indicative of the transient response of the respective network and synchronized with transitions of the digital data stream. The one or more secondary signal paths have variable gain being programmed through respective DC programming signals. The secondary output currents are coupled to the pair of current summing nodes to be summed with the primary output current of the primary signal path. The transmission line pre-emphasis circuit further includes an output loading stage coupled to the current summing nodes to generate a pre-emphasized digital output signal indicative of the one or more overshoot signals added to the digital data stream.

According to another embodiment of the present invention, a method for introducing pre-emphasis to a digital data stream being transmitted over a transmission line includes generating a primary output current indicative of the digital data stream, applying the digital data stream to one or more networks where each network has a specific transient response, generating secondary output currents representing one or more overshoot signals indicative of the transient response of the respective network and synchronized with transitions of the digital data stream, adjusting a gain of the secondary output currents through one or more DC programming signals, summing the primary output current with the secondary output current representing the one or more overshoot signals, and generating a pre-emphasized digital output signal based on the summed current where the pre-emphasized digital output signal being indicative of the one or more overshoot signals added to the digital data stream.

The present invention is better understood upon consideration of the detailed description below and the accompanying drawings.

DETAILED DESCRIPTION OF THE PREFERRED EMBODIMENTS

In accordance with the principles of the present invention, a transmission line pre-emphasis circuit includes a primary signal path providing switched currents indicative of the digital data stream to be transmitted and one or more secondary signal paths generating overshoot signals which are added to the output signal of the primary signal path to generate a pre-emphasized digital output signal to be transmitted on the transmission line. The overshoot signals can be in the form of a variable amplitude decaying exponential waveform with a predetermined time constant or a variable amplitude pulse with fixed pulse width. The transmission line pre-emphasis circuit of the present invention provides a flexible, systematic method of adding pre-emphasis, also referred to as controlled overshoot, to high speed differential or single-ended transmission line drivers.

Furthermore, the transmission line pre-emphasis circuit is implemented with programmable control to facilitate easy adjustment of the pre-emphasis amplitude and wave shape via common analog or digital programming techniques. In this manner, the transmission line pre-emphasis circuit of the present invention enables a single integrated circuit design to address a variety of transmission media with different signal loss characteristics by "programming" the pre-emphasis to match line loss characteristics of the different kinds of transmission media. Programmability can be achieved by setting DC bias currents via an analog technique (on-chip and/or off-chip resistors) or via one of many digital techniques.

The transmission line pre-emphasis circuit of the present invention modifies the shape of the transmitted signal so as to improve the quality of the received bit stream at the far end of the transmission line. When signal reception is improved, the cable length between two terminal points can be increased to eliminate the need for a repeater. In other words, when pre-emphasis is applied, the cable length can be increased so that the cable distance between two terminal points is increased before a repeater is needed. Eliminating or reducing the deployment of repeaters reduces system cost.

Figure 1:
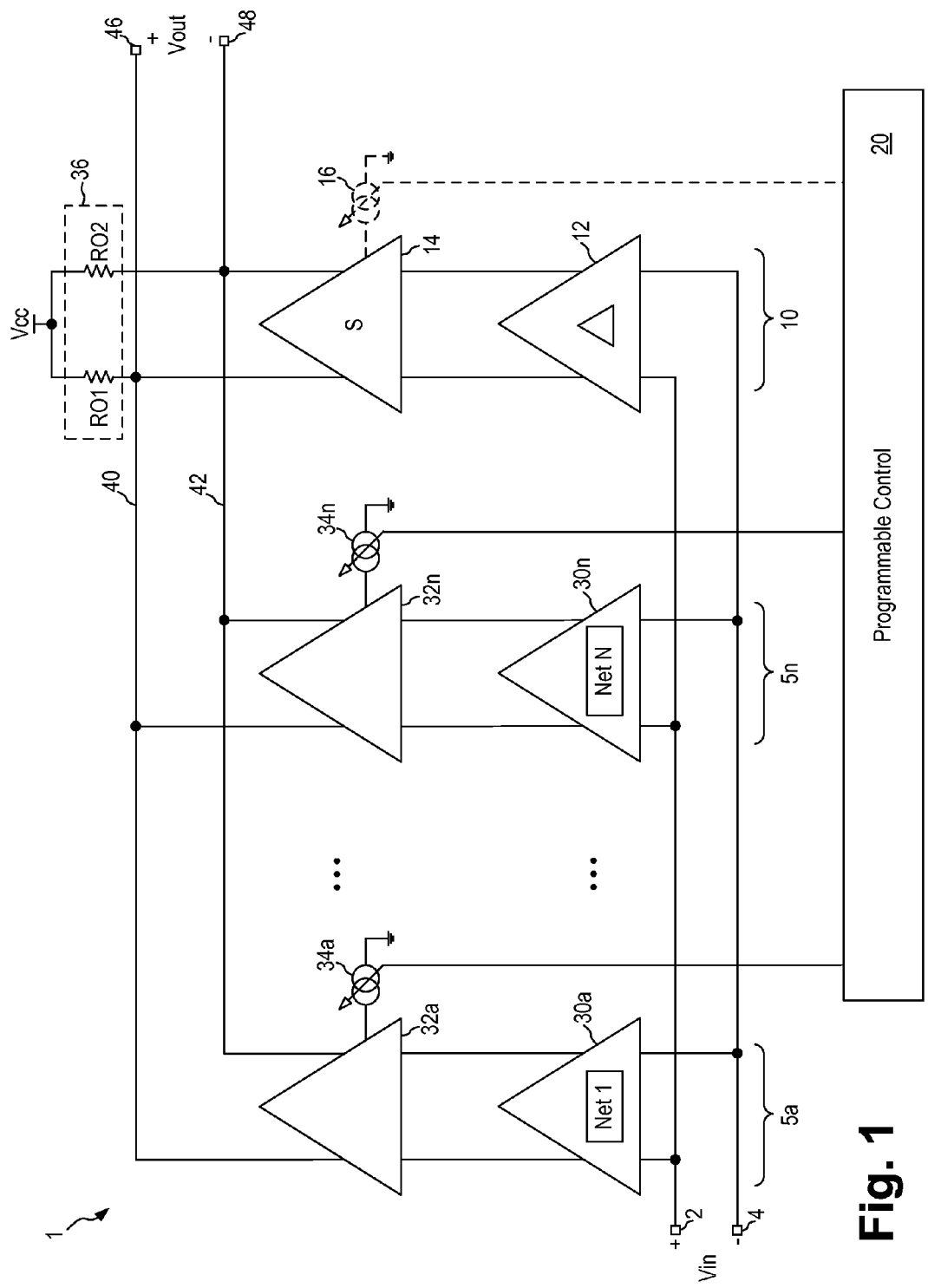
FIG. 1 is a schematic diagram of a transmission line pre-emphasis circuit according to a first embodiment of the present invention.

FIG. 1 is a schematic diagram of a transmission line pre-emphasis circuit according to a first embodiment of the present invention. Referring to FIG. 1, a transmission line pre-emphasis circuit 1 ("pre-emphasis circuit 1") receives a differential digital input signal Vin on a pair of differential input terminals 2, 4. Digital input signal Vin represents the digital data stream to be transmitted onto the transmission line. Input signal Vin is a digital bit stream with fast rise and fall time and may be described as a series of step functions that comprise a digital bit stream. Transmission line pre-emphasis circuit 1 generates a pre-emphasized differential output signal Vout on a pair of differential output terminals 46, 48. Transmission line pre-emphasis circuit 1 includes a primary signal path 10 for passing the digital input signal Vin and one or more secondary signal paths 5a to 5n. Each of the secondary signal paths incorporates one or more unique networks (Net 1 to Net N) to implement specific transient or frequency responses for the secondary signal path to allow pre-emphasis circuit 1 to address a variety of transmission media.

More specifically, the primary signal path 10 and the one or more secondary signal paths 5a-5n operate in parallel to generate the final pre-emphasized output signal Vout. In the present embodiment, each of the primary signal path and the one or more secondary signal paths includes two differential stages connected in series. The delays through all of the parallel signal paths are matched. The first differential stage in each of the parallel signal paths is driven in common by the differential input voltage Vin and the second differential stage in each of the parallel signal paths generates differential output currents. The differential output currents from all of the signal paths are summed at a pair of current summing nodes 40, 42 which is connected to a loading circuit 36 to generate the differential output voltage Vout on output nodes 46, 48. The differential output voltage Vout thus reflects the sum of the differential output currents from all signal paths. In the present embodiment, loading circuit 36 is implemented using a set of load resistors RO1 and RO2. In other embodiments, the loading circuit 36 can be implemented using common base transistors. The use of loading resistors is illustrative only and is not intended to be limiting.

Primary data path 10 includes a differential digital driver 12 providing a matching delay to the signal path and a current switch 14 driving switched current onto the current summing nodes 40, 42. More specifically, digital driver 12 receives the differential input signal Vin on its differential input terminals. The differential output current from digital driver 12 in turn drives current switch 14 which switches its differential output current on and off with negligible overshoot. The differential switched current from current switch 14, also referred to as the primary path output current, drives current summing nodes 40, 42. Load resistors RO1 and RO2, connected between the positive power supply voltage Vcc and a respective one of the current summing nodes 40, 42, convert the current on current summing nodes 40, 42 into the differential output voltage Vout on output nodes 46, 48, the differential output voltage being the pre-emphasized output signal.

In operation, primary signal path 10 generates a differential output current signal that mimics the digital input signal having fast rising and falling edges. In essence, primary signal path 10 passes the digital input signal Vin with matching delay and with optional amplification. In some embodiments, current switch 14 receives a programmable bias current from a current source 16. The programmable bias current from current source 16 functions to adjust the output amplitude of the primary path output current. Current source 16 is controlled by a DC programming signal from a programmable control block 20. The programmability of the bias currents in pre-emphasis circuit 1 will be described in more detail below. The use of programmable current source 16 is optional and may be omitted in other embodiments of the present invention.

In primary signal path 10, differential digital driver 12 serves two primary functions. Driver 12 provides a low impedance output for driving current switch 14. Driver 12 also serves to provide the necessary delay in the signal path to match the delay of the secondary signal paths. Ideal pre-emphasis requires that the overshoot and the primary switch output current edges should occur simultaneously. Therefore, it is necessary that the overshoot signals generated by the secondary signal paths occur at the same time as the primary switch output current provided by the primary signal path. In one embodiment, driver 12 is constructed using matching circuitry as the first stage amplifiers in the secondary signal paths to ensure matching delay.

In pre-emphasis circuit 1, overshoot signals are generated by the one or more secondary signal paths 5a-5n which operate in parallel with the primary signal path 10. In the present embodiment, each secondary signal path 5a-n includes a first stage amplifier 30a-n implementing a wave shaping function and a second stage amplifier 32a-n providing signal amplification. The first stage amplifiers 30a-n are driven in common by the differential input voltage Vin. The second stage amplifiers 32a-n receive the overshoot signals (also referred to as "wave shaping signals") from the respective first stage amplifiers 30a-n and generate second stage differential output currents each having a specific transient response. Thus, the shape and magnitude of each secondary path output current are determined primarily by the first stage wave shaping network and the second stage gain respectively. The differential output currents of all secondary signal paths 5a-n are summed at the current summing nodes 40, 42 and drive the loading circuit 36 including load resistors RO1 and RO2. The secondary signal paths 5a-n generate various transient responses which are added to the digital input signal passed by the primary signal path 10.

In the present embodiment, a simple, fixed network (Net 1 to Net N) is embedded within each of the first stage amplifiers 30a-n to generate a specific transient response for that secondary signal path. The network in each secondary signal path determines the overshoot amplitude and shape or the time constant of the transient response to be generated. In the present description, the transient response of the network refers to the frequency or transient response characteristic of the network Net 1 to Net N which frequency or transient response is selected to boost the gain of the specific frequency components of the input signal. The transient response and the network implementing the transient response thereof can include a frequency response with a specific time constant (serial connection of a resistor and a capacitor), or an overshoot pulse (a single capacitor). The advantage of the networks used in the signal paths of pre-emphasis circuit 1 is that only very simple network is needed to select the desired transient response. In some embodiments, each network includes only one or two passive electrical components, such as resistors and/or capacitors.

In secondary signal paths 5a-5n, second stage amplifiers 32a-n provide amplification of the wave shaping signals generated by the first stage amplifiers 30a-n. According to embodiments of the present invention, the current gain of each of the second stage amplifiers 32a-n is set by a DC programming signal. More specifically, the current gain of each of the second stage amplifiers is set by a DC bias current provided by a programmable current source controlled by a DC programming signal. Accordingly, transmission line pre-emphasis circuit 1 realizes programmability of the wave shaping signal by implementing programmable current gain at the second stage amplifiers 32a to 32n. Programmable current gain can also be implemented at current switch 14 in the primary signal path 10, as described above. As described above, programmable current gain in the primary signal path 10 is optional and may be omitted in other embodiments of the present invention.

More specifically, each second stage amplifier 32a-32n receives a programmable bias current from a respective current source 34a-n and current switch 14 receives programmable bias current from current source 16. Current sources 16, 34a to 34n are controlled by programmable control block 20 to set the desired magnitude of the bias current applied to the primary signal path 10 and each secondary signal path 5a-n, thereby adjusting the gain for each signal path. In operation, the small signal current gain of the second stage amplifiers and the magnitude of switched currents are proportional to the magnitude of the respective applied bias currents.

Hence, varying values of the DC bias current provided by current sources 16, 34a-n vary the gain of the signal paths and thereby also vary the amplitude of the primary output current and the relative proportions of the overshoot/wave shaping signals generated at each secondary signal paths that are summed at current summing nodes 40, 42. The overshoot or wave shaping signals can be precisely tailored by adjusting the magnitudes of each secondary signal path individually to obtain the desired pre-emphasized output signal.

Programmable control block 20 can be implemented using a variety of DC programming techniques presently known or to be developed. In one embodiment, the programming of the DC bias current is through a set of resistors, one for each signal path to be programmed. These resistors directly or indirectly determine the level of the tail currents supplying the second stage amplifiers and the current switch. These resistors are typically off-chip (i.e. not on the same integrated circuit as the transmission line pre-emphasis circuit). In other embodiments, the programming of the DC bias currents is accomplished by other means. On-chip resistors can be used to set a fixed gain value for a non-programmable signal path. Programmable bias currents may also be determined via on-chip digital-to-analog converters wherein the digital programming data is loaded to the pre-emphasis circuit chip and retained in some form of volatile or non-volatile storage elements. Other programming means include (but are not limited to) registers, reprogrammable cells such as flash or EPROM, and non-reprogrammable cells, such as fuses, anti-fuses, "zapped" Zener diodes, any of which may be programmed via well-known techniques.

In pre-emphasis circuit 1, the unique network incorporated in each secondary signal path generates the desired shape of the transient response for that signal path. The programmable bias currents applied to the second stage amplifiers 34a-n allow the amplitudes of the specific transient response of each secondary signal path to be individually tailored. When the transient responses are combined synchronously with the primary path output signal, a pre-emphasis output signal Vout with controlled overshoot at each signal transition is obtained. With a reasonable selection of networks, one pre-emphasis circuit design in accordance with the present invention can be used to optimally compensate for large classes of transmission line losses that typically vary with transmission line length and material properties. The pre-emphasis circuit of the present invention represents a marked improvement over conventional pre-emphasis circuits where compensation can only be optimized for a limited class of transmission lines.

In the above-described embodiment, the transmission line pre-emphasis circuit 1 is configured for differential signaling. In other embodiments, transmission line pre-emphasis circuit 1 can be configured for single-ended input signals by connecting the single ended signal to one digital input terminal (2 or 4) and connecting the other digital input terminal to a fixed voltage with a value between the high and low signal levels. Single ended output signals are, of course, available in both true and inverted forms at the respective output terminals 46 and 48.

Figure 2:
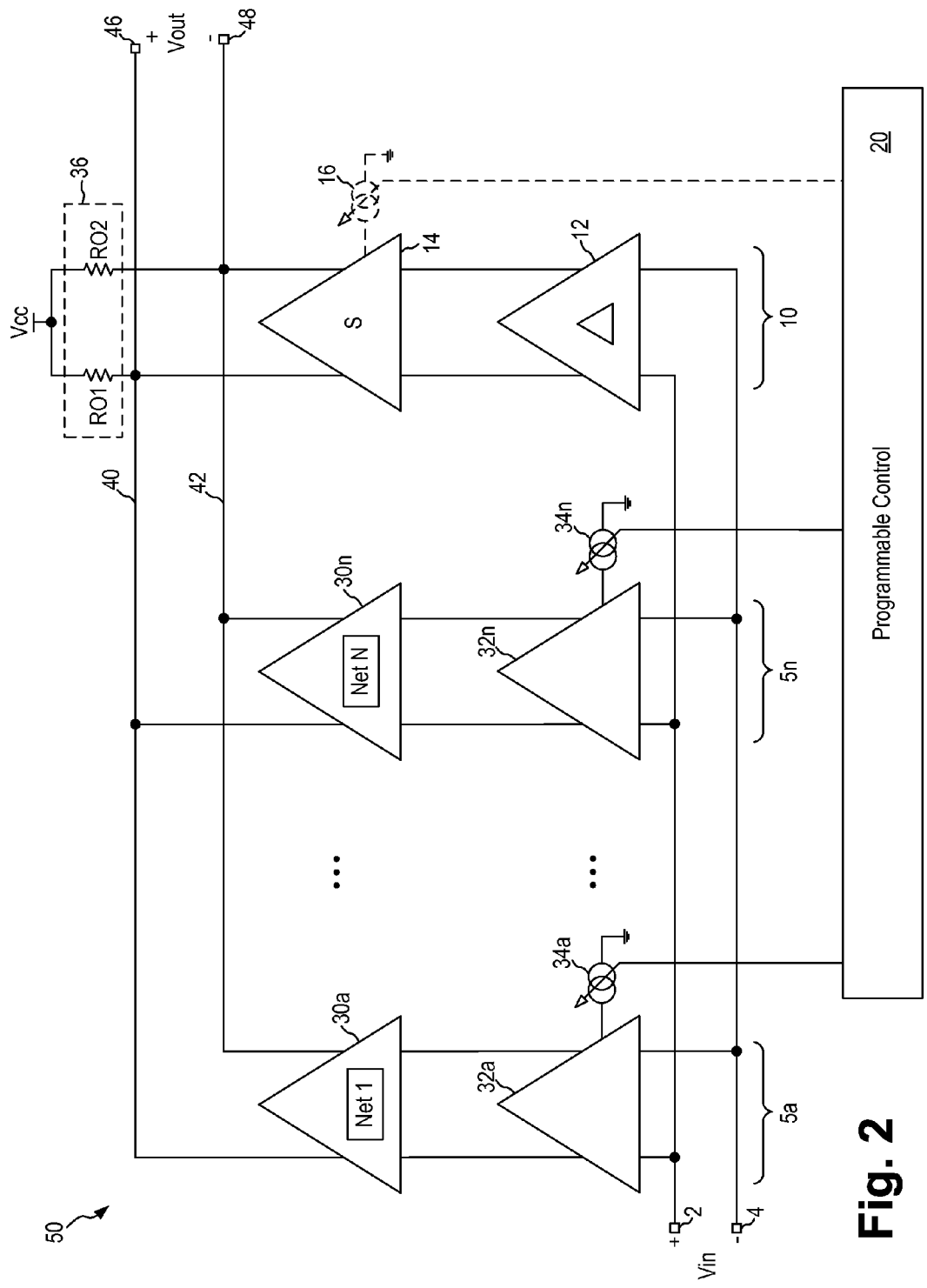
FIG. 2 is a schematic diagram of a transmission line pre-emphasis circuit according to a second embodiment of the present invention.

In the pre-emphasis circuit shown in FIG. 1, the secondary signal paths are constructed using the first stage amplifiers as the wave shaping stage and the second stage amplifiers as the gain stage or amplification stage. In other embodiments, the arrangement of the wave shaping stage and the gain stage can be varied. FIG. 2 is a schematic diagram of a transmission line pre-emphasis circuit according to a second embodiment of the present invention. Referring to FIG. 2, transmission line pre-emphasis circuit 50 is constructed in the same manner as pre-emphasis circuit 1 of FIG. 1 and like elements are given like reference numerals and will not be further described. In transmission line pre-emphasis circuit 50, the first stage amplifiers 32a-n are implemented as gain stages and the second stage amplifiers 30a-n are implemented as wave shaping stages. Pre-emphasis circuit 50 operates in the same manner as pre-emphasis circuit 1 to generate a pre-emphasis output voltage incorporating transient responses created by the unique networks Net1 to Net N.

In the embodiments shown in FIGS. 1 and 2, the secondary signal paths in the respective pre-emphasis circuits are constructed all in the same manner. That is, the secondary signal paths in a pre-emphasis circuit are constructed with all gain stage first or all gain stage last. The specific arrangement of gain and wave shaping stages shown in FIGS. 1 and 2 is illustrative only and not intended to be limiting. In other embodiments, a transmission line pre-emphasis circuit can be formed using a combination of secondary signal paths, some with the gain stage first and the wave shaping stage last and some with the wave shaping stage first and the gain stage last.

Figure 3:
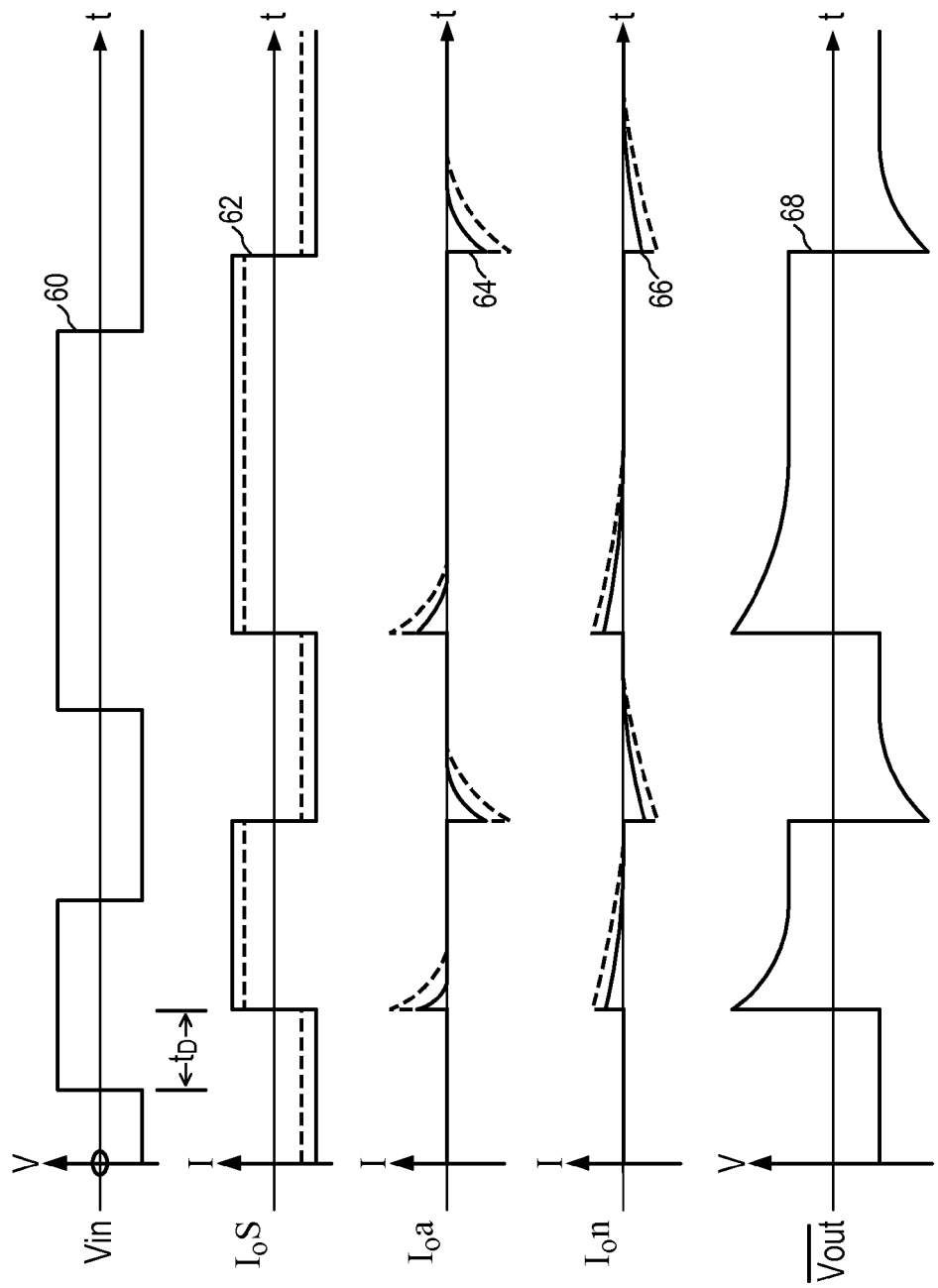
FIG. 3 illustrates the signal waveforms from the pre-emphasis circuit of FIG. 1 or 2 according to embodiments of the present invention.

FIG. 3 illustrates the signal waveforms from the pre-emphasis circuit of FIG. 1 or 2 according to embodiments of the present invention. Referring to FIG. 3, the digital input voltage Vin (curve 60) is a digital bit stream with fast transitions, that is, fast rising and falling edges. The primary path output current $I_oS$ (curve 62) from current switch 14 is basically a delayed version of the input voltage Vin. In the present illustration, the propagation delay through the primary or secondary signal path is denoted as $t_D$. As described above, all the signal paths are configured to have the same propagation delay so that the transient response can be added synchronous to the rising and falling edges of the input signal Vin. The primary signal path functions as a buffer, transferring only edge timing information to the current summing nodes. That is, the output DC levels and edge speeds of the primary path output current are reestablished within the primary signal path and not transferred from the input through the output of the primary signal path. The amplitude of the primary path output current (curve 62) can be adjusted by providing a programmable bias current through current source 16. In FIG. 3, the dashed line represents a different amplitude to which the primary signal path output current can be programmed.

In FIG. 3, two exemplary secondary path differential output currents $I_oa$ (curve 64) and $I_on$ (curve 66) are shown. Current $I_oa$ (curve 64) exemplifies a secondary signal path incorporating a network with a relatively fast time constant or fast exponential decay. Thus, each transition of current $I_oa$ has a fast current spike that decays quickly. Current $I_on$ (curve 66), on the other hand, exemplifies a secondary signal path incorporating a network with a long time constant or slow exponential decay. Thus, each transition of current $I_on$ has a current spike that decays slowly over time. Again, the dashed line for each output current represents a different amplitude to which the secondary signal path can be programmed using programming bias currents. The amplitude of the output current is modified by adjusting the gain of the gain stage through providing the appropriate programming bias current. However, the secondary path time constants are fixed by the network used in the wave shaping stage.

In operation, a broad range of different single or multiple time constant responses may be approximated by summing the output current signal of the primary signal path with varying proportions of output currents from the multiple secondary signal paths. More specifically, the primary path output current $I_oS$ and the secondary path output currents ($I_oa$ and $I_on$) are combined at the current summing nodes and converted to a differential output voltage Vout (curve 68) at the loading circuit. In sum, the individual transient current response of each secondary signal path reflect the current resulting from the application of input signal Vin to the embedded network as scaled by the gain setting of that signal path. Relative proportions of the transient current responses from each secondary signal path are summed and added to the output current signal of the primary signal path to yield the pre-emphasized output signal Vout. In this manner, adequate compensation for a wide range of transmission line loss characteristics can be achieved using the pre-emphasis circuit of the present invention with only a few secondary path circuits having their amplitude properly adjusted via programming. Accordingly, curve 68 in FIG. 3 represents one of an infinity number of pre-emphasis compensation profiles that could be achieved by the same pre-emphasis circuit.

Figure 4:
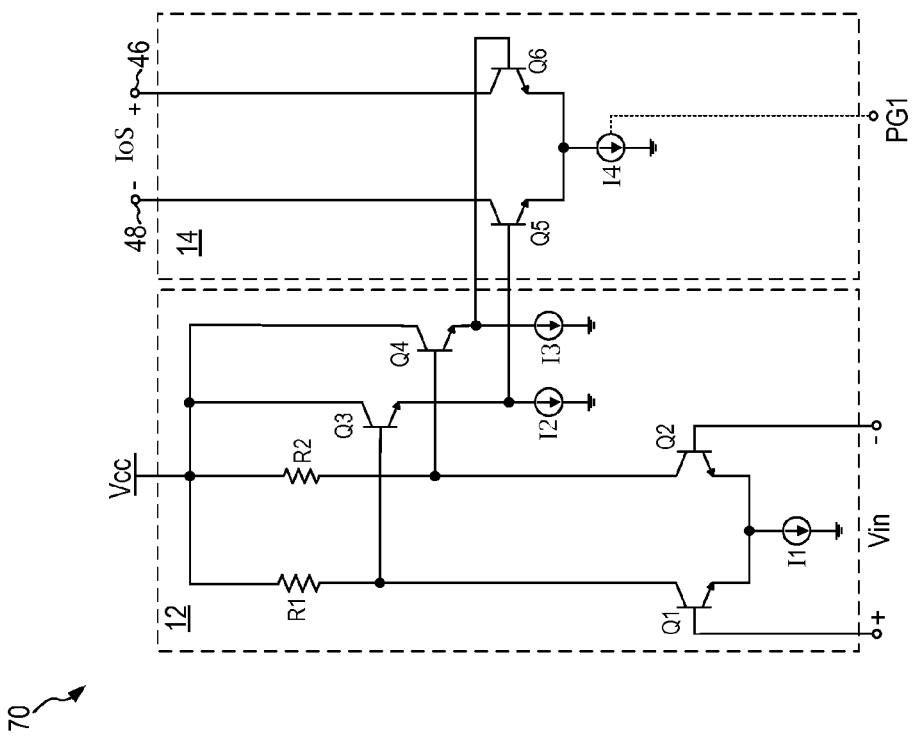
FIG. 4 is a transistor level circuit diagram of the primary signal path according to one embodiment of the present invention.

FIG. 4 is a transistor level circuit diagram of the primary signal path according to one embodiment of the present invention. Referring to FIG. 4, driver 12 is formed by a digital buffer or a voltage amplifier transistors Q1 and Q2 and loading resistors R1 and R2. Driver 12 is used to match the total primary signal path delay to the secondary signal path delays. Driver 12 also provides a low impedance drive to the current switch 14 formed as a differential pair including transistors Q5 and Q6. Current switch 14 is implemented as a transconductance amplifier operative to receive the voltage output signals from digital buffer 12 and generate output currents on output nodes 46 and 48. Current source 14 driving the current switch 14 can be a fixed current source or a programmable current source controlled by a programming signal PG1. In the present embodiment, the primary signal path 70 is constructed using bipolar transistors. In other embodiments, the primary signal path can be constructed using other devices, such as MOS transistors.

Figure 5:
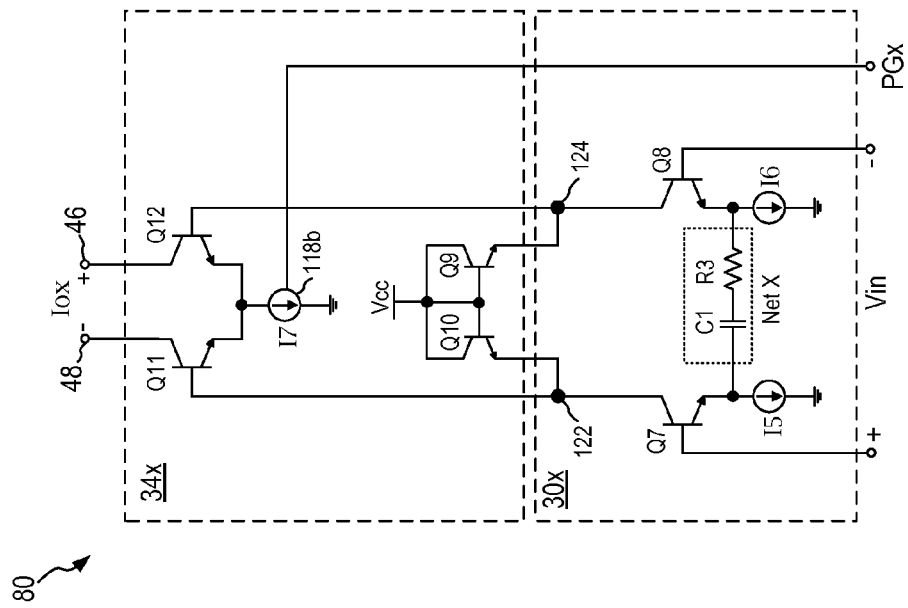
FIG. 5 is a transistor level circuit diagram of an exemplary secondary signal path according to one embodiment of the present invention.

FIG. 5 is a transistor level circuit diagram of an exemplary secondary signal path according to one embodiment of the present invention. Referring to FIG. 5, secondary signal path 80 is constructed with the wave shaping stage 30x first and gain stage 34x last. In the wave shaping stage 30x, transistors Q7 and Q8 form a differential amplifier. A network Net X is embedded at the emitter terminals of transistors Q7 and Q8 to provide the desired transient response. In the present illustration, a network including a capacitor C1 connected in series with a resistor R3 is used. The capacitance and resistance values of capacitor C1 and resistor R3 are chosen to determine the overshoot time constant for the signal path. Transistors Q7 and Q8 generate a differential output current at their collector terminals 122, 124. Wave shaping stage 30x is thus a transconductance amplifier, receiving an input voltage Vin and generating output currents on terminals 122, 124.

Gain stage 34x is implemented as a variable gain current amplifier. In particular, in the present embodiment, gain stage 34x is implemented as a Gilbert gain cell. The Gilbert gain cell and multiplier is described in U.S. Pat. No. 3,689,752, to Barrie Gilbert. Characteristics of the Gilbert gain cell include differential amplifier techniques wherein linear-to-nonlinear and compensating nonlinear-to-linear signal transformations and current amplification are employed to minimize signal voltage amplitude and preserve high bandwidth. Due to inherent input to output capacitances, most transistors, including bipolar transistors, exhibit higher frequency capability in current amplification modes where the output terminal (collector) voltage is not allowed to move very much. Hence, Gilbert gain cell circuitry provides superior high frequency response capability for the present application.

A salient feature of the Gilbert gain cell is that the Gilbert amplifiers generally have the capability of responding as fast or faster than any other circuit elements built using the same semiconductor technology. Incorporation of the Gilbert gain cell concepts within the present invention assures adequate pre-emphasis performance can be realized for all data rates that might be driven using the same semiconductor technology. This is an important advantage for transceiver applications, where both data stream driver and receiver coexist on the same chip. Lastly, these advantages apply within most common semiconductor technologies including MOS, CMOS, etc., and are not limited to bipolar technologies.

Another feature of the Gilbert gain cell is the use of non-linear loading. Bipolar and MOS transistors are not linear devices. Specifically, device transconductance ("voltage in to current out") characteristics are nonlinear. For bipolar transistors, the base-to-emitter input voltage and collector output current dynamics are exponentially related. For MOS transistors, the gate-source input voltage to drain output current characteristic is basically a square law relationship. In a Gilbert gain cell, to linearize the output of the transistors, a nonlinear load having the opposite or inverse nonlinear characteristics is coupled to the input of the amplifier to cancel out the inherent nonlinearity of the transistors. For example, when the output current at the amplifier is proportional to the exponential of the input voltage, then a load formed of diodes wherein the voltage across the load varies logarithmically with the current applied to this load. The logarithmic relationship at the input nodes cancels out the exponential characteristic at the output nodes and a linear current amplifier is obtained. As thus constructed, linear current gain amplification can be realized. By using a nonlinear load that has the inverse I-V characteristics of the transistor transconductance characteristic, linear current amplification is achieved.

In gain stage 34x, transistors Q9 and Q10 are diode-connected and serve as non-linear load elements for the output currents generated by the wave shaping stage 30x. More specifically, the non-linearity of transistors Q9 and Q10 is the inverse of the non-linear input-voltage-to-output-current characteristics of the differential pair formed by transistors Q11 and Q12. As a result, the non-linearities cancel each other and the gain stage 34x of the secondary signal path 80 including transistors Q9, Q10 Q11 and Q12 is a linear current amplifier. The gain of the linear current amplifier is set by the bias current I7 provided by a current source 118b. The bias current I7 can be varied through a programming signal PGx to vary the gain of the gain stage and the signal path. By adjusting the bias current I7 through programming signal PGx, varying proportion of the transient response can be introduced to the output voltage of the pre-emphasis circuit.

Figure 6:
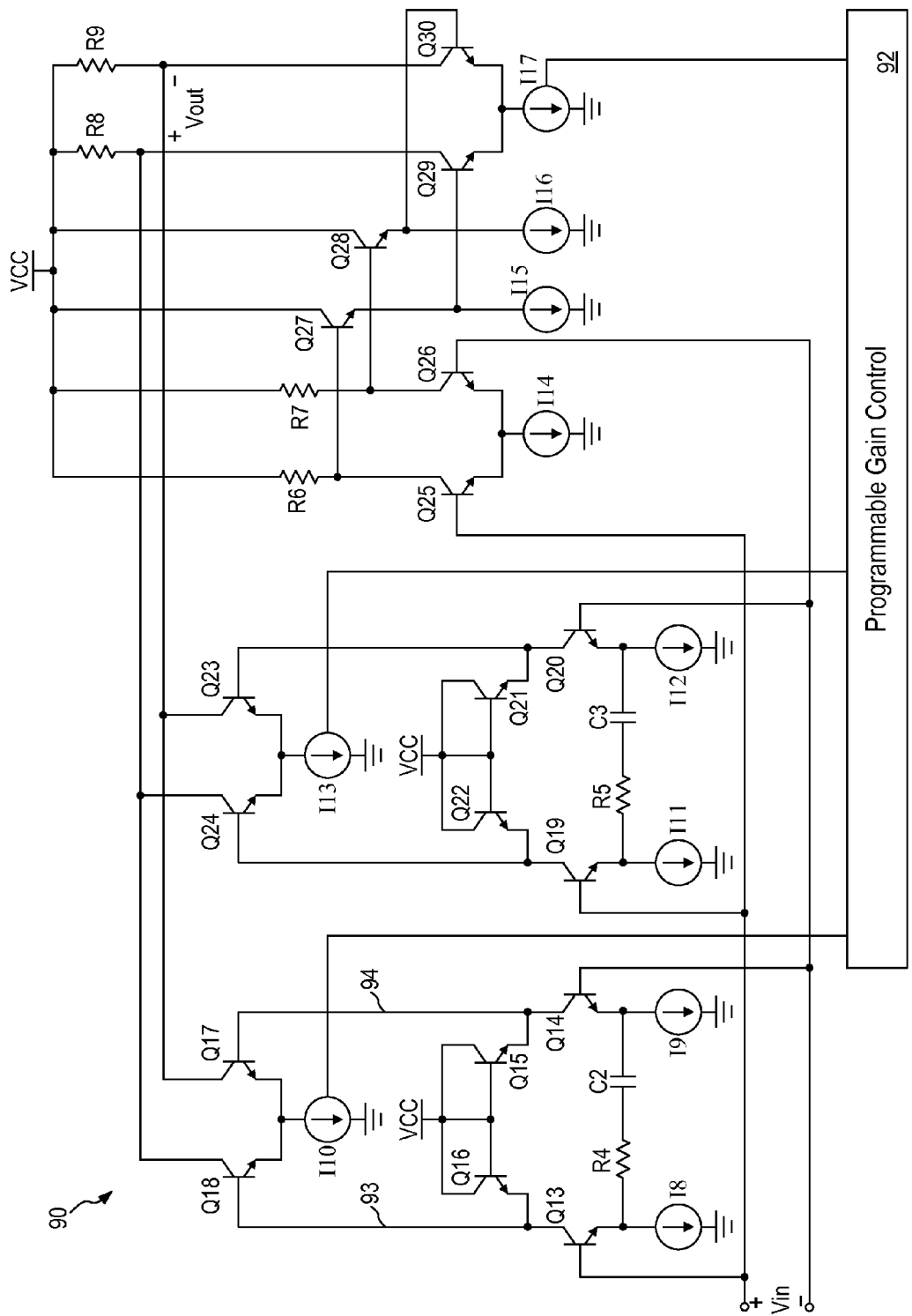
FIG. 6 is a transistor level circuit diagram of the transmission line pre-emphasis circuit of FIG. 1 according to one embodiment of the present invention.

FIG. 6 is a transistor level circuit diagram of the transmission line pre-emphasis circuit of FIG. 1 according to one embodiment of the present invention. In the embodiment shown in FIG. 6, a pre-emphasis circuit 90 includes a primary signal path and two secondary signal paths configured with the wave shaping stage first. The primary signal path includes a differential amplifier formed by transistors Q25 and Q26 as the digital driver and a differential amplifier formed by transistors Q29 and Q30 as the current switch. The gain of the current switch is programmable through programmable bias current 117.

The first secondary signal path includes a differential amplifier formed by transistors Q13 and Q14 with an embedded network formed by a resistor R4 and a capacitor C2 as the wave shaping stage. The first secondary signal path further includes a gain stage formed by non-linear loading transistors Q15 and Q16 and a differential pair formed by transistors Q17 and Q18. The current gain of the gain stage is programmable through programmable bias current I10.

The second secondary signal path includes a differential amplifier formed by transistors Q19 and Q20 with an embedded network formed by a resistor R5 and a capacitor C3 as the wave shaping stage. The second secondary signal path further includes a gain stage formed by non-linear loading transistors Q21 and Q22 and a differential pair formed by transistors Q23 and Q24. The current gain of the gain stage is programmable through programmable bias current I13.

In pre-emphasis circuit 90, the first secondary signal path and the second secondary signal path provide transient responses having different time constants. In other words, the time constant realized by the network embedded in each of the secondary signal paths is unique. Thus, the time constant R4*C2 is different from the time constant R5*C3. The mixing of different proportions of the different transient responses realizes flexibility to allow the pre-emphasis circuit to address many different applications having different transmission line loss characteristics.

Figure 7:
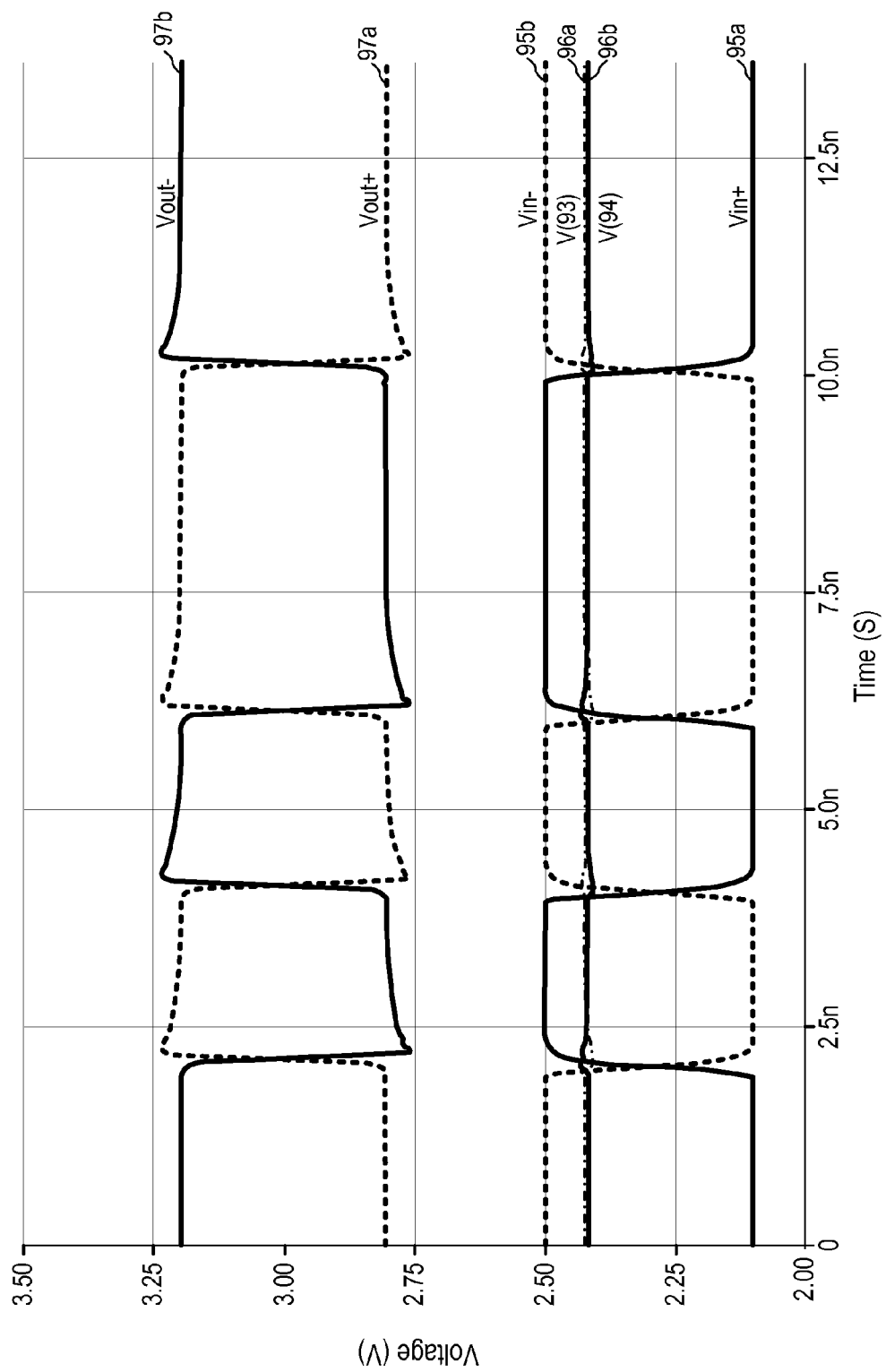
FIG. 7 is a waveform diagram of voltage signals in the pre-emphasis circuit of FIG. 6.

FIG. 7 is a waveform diagram of voltage signals in the pre-emphasis circuit of FIG. 6. Referring to FIG. 7, the differential input voltage is shown as the positive input voltage Vin+ (curve 95a) and the negative input voltage Vin- (curve 95b). The differential output voltage at nodes 93, 94 (curves 96a, 96b) generated by the wave shaping stage of the first secondary signal path includes signal transients that coincide with the transitions (rising and falling) edges of the input voltage. The differential output voltage at nodes 93, 94 represents very small, non-linear interstage voltage swings that help assure that high bandwidth of operation is preserved. The resulting differential output voltage is shown as the positive output voltage Vout+ (curve 97a) and negative output voltage Vout- (curve 97b). As a result of the wave shaping stages of the two secondary signal paths, the rising and falling edges of the output voltages are boosted with controlled overshoot.

Figure 8:
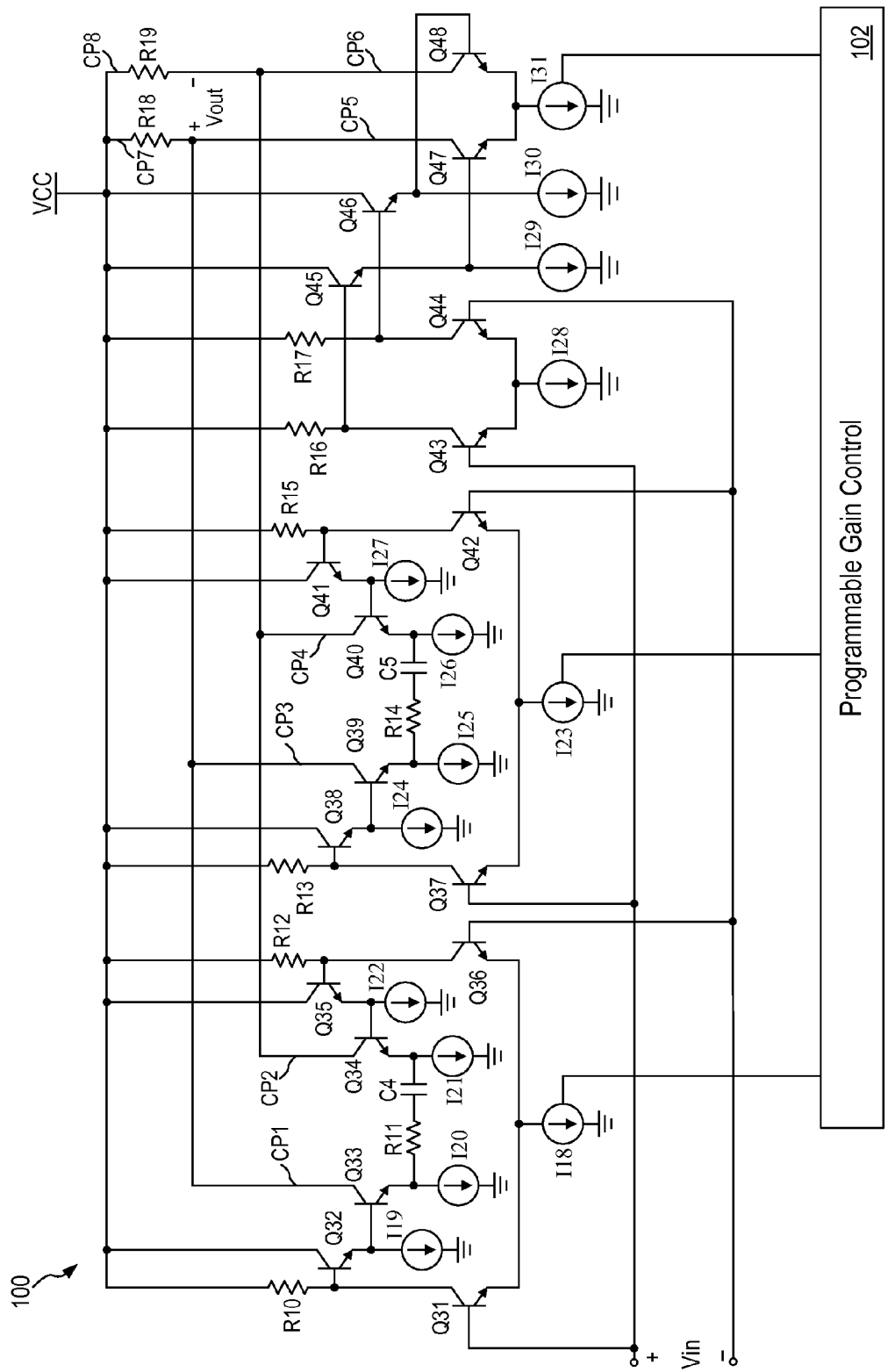
FIG. 8 is a transistor level circuit diagram of the transmission line pre-emphasis circuit of FIG. 2 according to one embodiment of the present invention.

FIG. 8 is a transistor level circuit diagram of the transmission line pre-emphasis circuit of FIG. 2 according to one embodiment of the present invention. Referring to FIG. 8, pre-emphasis circuit 100 is constructed in a similar manner as pre-emphasis circuit 90 of FIG. 7 except that in each of the two secondary signal paths, the gain stage is provided before the wave shaping stage. Thus, in the first secondary signal path, the gain stage is formed by transistors Q31 and Q36 as the differential pair and resistors R10 and R12 serve as the linear loads for transistors Q31 and Q36. As a result, the gain stage becomes a "voltage in, voltage out" linear voltage amplifier where the differential output voltage at the collector terminals of transistors Q31 and Q36 varies with the magnitude of the programmable current I18. The first secondary signal path further includes a wave shaping stage formed by transistors Q33 and Q34 functioning as a "voltage in, current out" transconductance amplifier. The wave shaping stage is embedded with a network including a resistor R11 and a capacitor C4 for shaping the transient response of the signal path. Resistor R11 and capacitor C4 define the time constant provided by the first secondary signal path.

The second secondary signal path is similarly constructed. Transistors Q37 and Q42 with resistors R13 and R15 function as the gain stage while transistors Q39 and Q40 function as the wave shaping stage. The gain of the gain stage is programmably adjusted by current source I23. The second secondary signal path is embedded with a network formed by a resistor R14 and a capacitor C5. Resistor R14 and capacitor C5 define the time constant of the transient response provided by the second secondary signal path.

In pre-emphasis circuit 100, the resistance and capacitance values of the two networks are chosen to realize different transient responses to provide flexibility in deriving the desired pre-emphasis to the input signal Vin for the class of pre-emphasis tasks under consideration. Programming signals providing by a programmable gain control block 102 control the programmable bias currents I18, I23 and I31. Bias currents I18, I23 and I31 are adjusted to select the relative proportions of transient responses and primary signal to be summed at the summing node. As a result, an output signal Vout having the desired controlled overshoots is generated.

Figure 9:
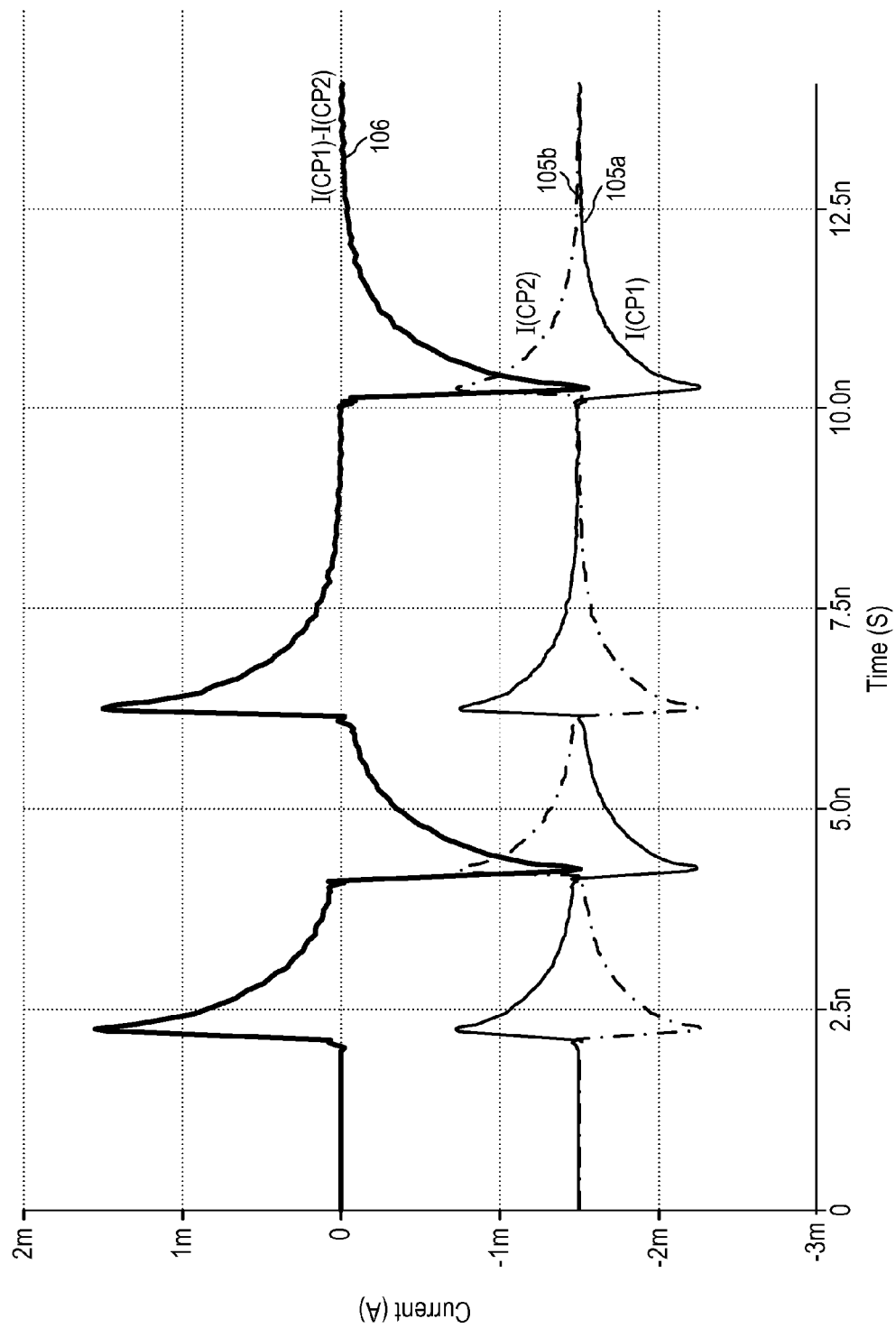
FIGS. 9-11 are waveform diagrams of signals in the pre-emphasis circuit of FIG. 8.
Figure 10:
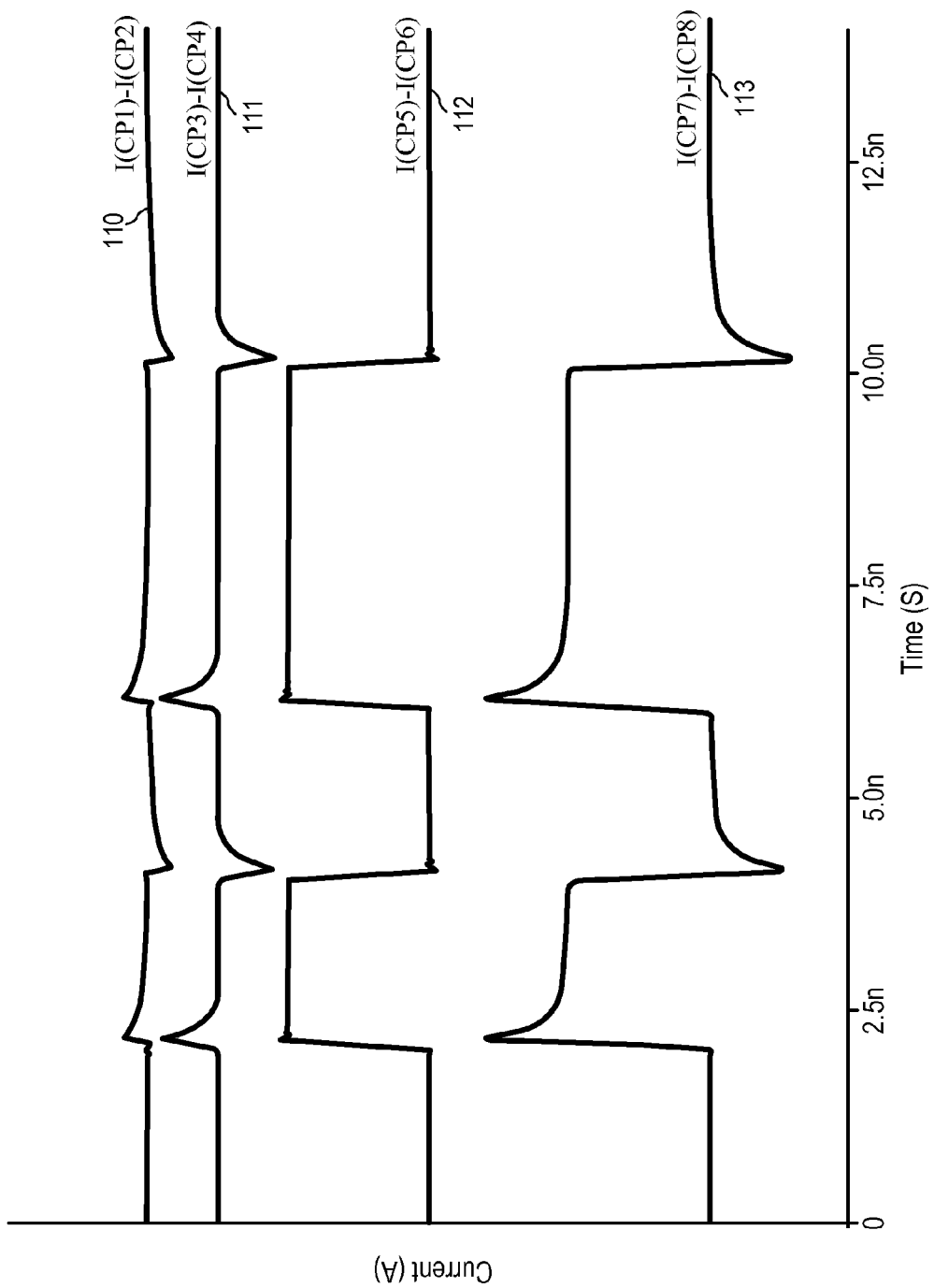
Figure 11:
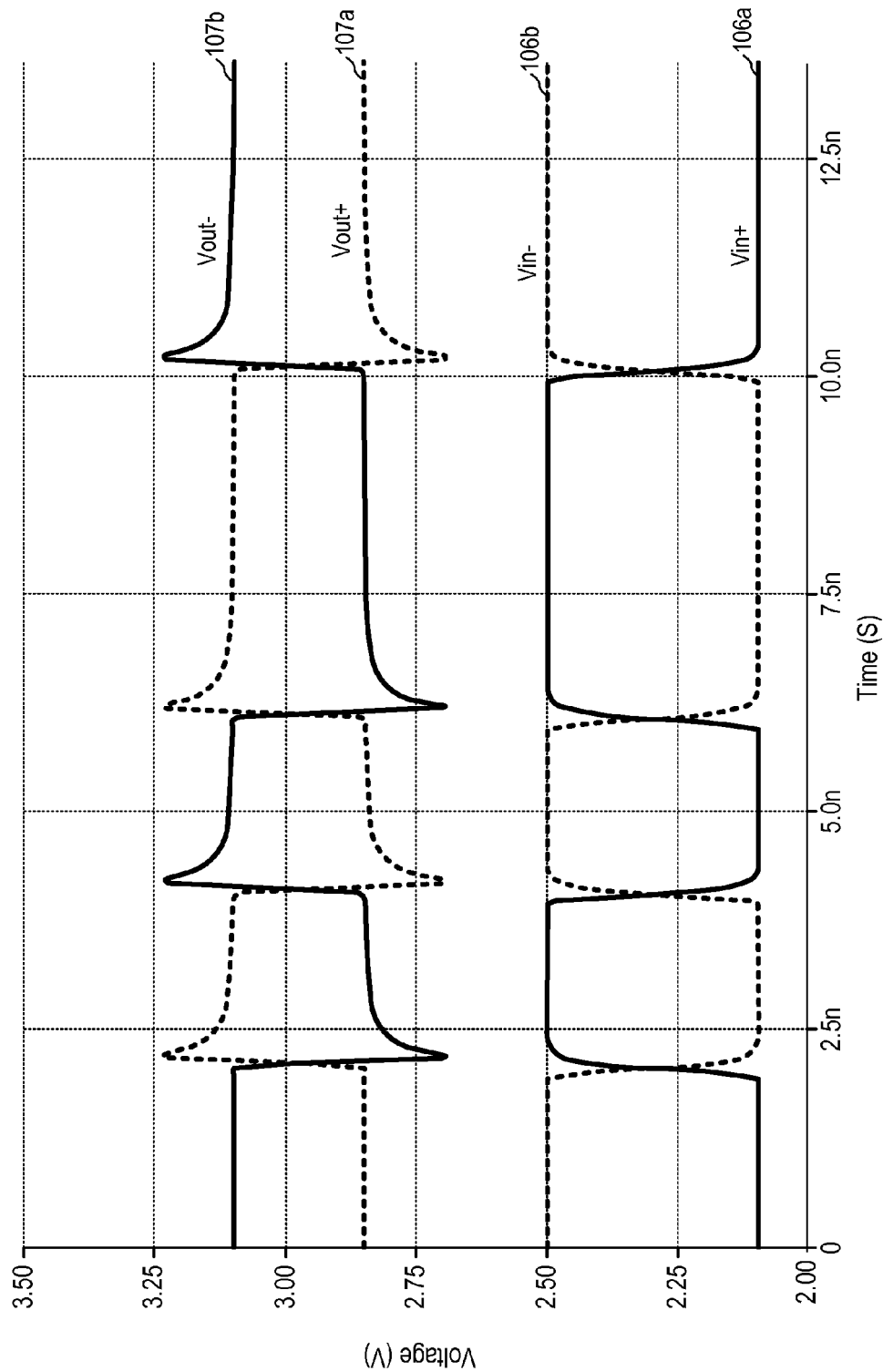

FIGS. 9-11 are waveform diagrams of signals in the pre-emphasis circuit of FIG. 8. Referring to FIG. 9, the individual branch output currents from the first secondary signal path (nodes CP1 and CP2) are shown as curves 105a and 105b. The differential output current of the signal path (I(CP1)-I(CP2)) gives an output signal with controlled overshoot (curve 106) at the rising and falling edges of the input voltage Vin. The amount and shape of the overshoot and the time constant are determined by the network embedded in the signal path (resistor R11 and capacitor C4) and the programmable bias current (I18).

FIG. 10 illustrates the differential output currents from the first and second secondary signal path and from the primary signal path. The curves shown in FIG. 10 are differential currents, having average values of zero. The curves in FIG. 10 are arbitrarily spread out in the vertical scale to better illustrate the shape and relative magnitude of each curve. The vertical spacing of the curves in FIG. 10 do not represent currents with different average DC values. Referring to FIG. 10, the differential output current (I(CP1)-I(CP2)) from the first secondary signal path (curve 110) and the differential output current (I(CP3)-I(CP4)) from the second secondary signal path (curve 111) are shown. The two differential output currents have different overshoot shapes, amplitude and time constants according to the unique network embedded in each signal path and the programmable bias current. On the other hand, the differential output current (I(CP5)-I(CP6)) from the primary signal path (curve 112) reflects the input signal Vin with insignificant signal transients at the rising and falling edges. The combined differential output currents (I(CP7)-I(CP8)) of the primary signal path and the two secondary signal paths (curve 113) is an output signal indicative of the input signal but with the combined overshoots of secondary signal paths added to the transitions (rising and falling edges) of the input signal.

Referring now to FIG. 11, the differential input voltage Vin+, Vin− (curves 106a, 106b) is shown in contrast with the differential output voltage Vout+, Vout− (curves 107a, 107b). As a result of the transient responses introduced by pre-emphasis circuit 100, programmable quantities of controlled overshoots from multiple parallel paths are added to the input signal Vin to generate a pre-emphasized output signal Vout, thus providing a practical method of compensating for frequency dependent losses of a subsequent driven, transmission line.

Figure 12:
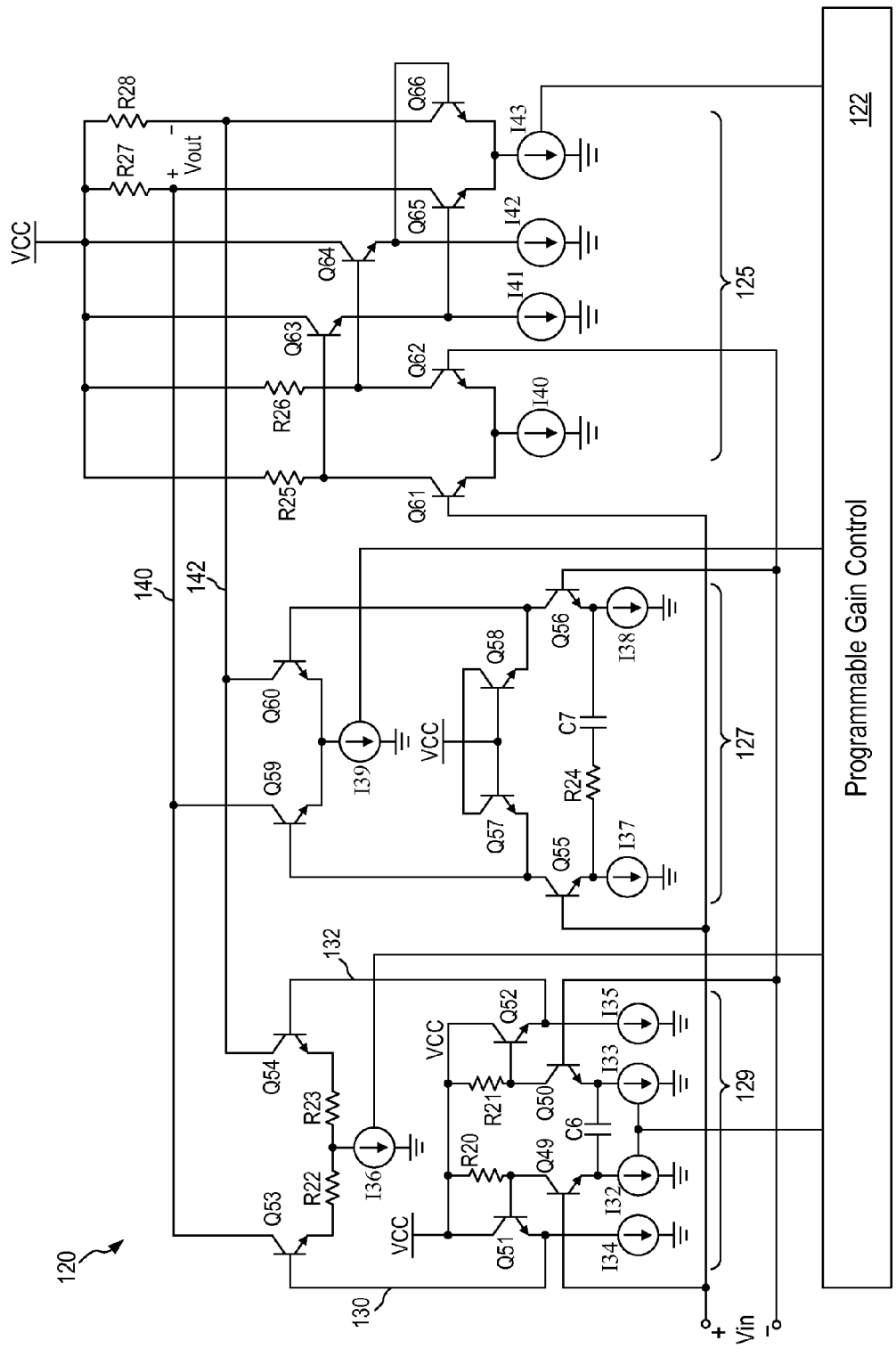
FIG. 12 is a transistor level circuit diagram of a transmission line pre-emphasis circuit according to an alternate embodiment of the present invention.

According to another aspect of the present invention, a pre-emphasis circuit incorporates a switching secondary signal path as an alternative method of providing a controlled overshoot to the input signal. More specifically, the switching secondary signal path generates overshoot pulses as opposed to decaying exponential waveforms and is sometimes referred to as "pulse shaping secondary signal path." FIG. 12 is a transistor level circuit diagram of a transmission line pre-emphasis circuit according to an alternate embodiment of the present invention. Referring to FIG. 12, a transmission line pre-emphasis circuit 120 includes a primary signal path 125 and a first secondary signal path 127. Primary signal path 125 and secondary signal path 127 are constructed in the same manner as described above and will not be further described. In particular, first secondary signal path 127 includes a wave shaping network of a resistor R24 and a capacitor C7 and provides a wave shaping signal with a decaying exponential waveform having a time constant determined by resistor R24 and capacitor C7.

Transmission line pre-emphasis circuit 120 further includes a secondary signal path 129 that is switching and referred hereinafter as the "switching secondary signal path." Switching secondary signal path 129 is different from the secondary signal path described above in that the input transistors of the differential pair are switched in operation. Furthermore, switching secondary signal path 129 is also different from the secondary signal path described above in that switching secondary signal path 129 generates fixed width, variable amplitude pulses that have fixed rise and fall times (also referred to as edge rates) as opposed to the decaying exponential waveform having a specific time constant generated by secondary signal paths having a resistor-capacitor as the network. The pulses generated by the switching secondary signal path provide another way to introduce controlled overshoots to the pre-emphasized output signal. In the present description, a secondary signal path that provides a decaying exponential waveform having a given time constant will be referred to as a "wave shaping secondary signal path". On the other hand, a secondary signal path that provides a fixed width, variable amplitude pulse will be referred to as a "switching secondary signal path" or a "pulse shaping secondary signal path."

More specifically, pulse shaping secondary signal path 129 includes a differential pair of transistors Q49 and Q50 with a capacitor C6 connected between the emitter terminals of the transistors forming the pulse shaping stage of the signal path. Capacitor C6 functions as the pulse shaping network. In operation, when the differential input voltage Vin changes state, the polarity of the differential base voltage between transistors Q49 and Q50 reverses. That is, the previously higher base voltage becomes the low base voltage and vice versa. Since the voltage across capacitor C6 cannot change instantaneously, current flow through the transistor with the now-lower base voltage is temporarily cutoff, and the bias current previously flowing through that emitter flows instead through C6. Consequently the collector current of the transistor with the now-lower base voltage becomes zero, while the collector current of the transistor with the now-higher base voltage becomes the sum of bias currents I32 and I33. This condition persists until the bias current sufficiently discharges capacitor C6 to fully reestablish forward bias of the emitter-base junction of the transistor with the lower base voltage. At that time bias currents I32 and I33 again flow through transistors Q49 and Q50 respectively. As currents I32 and I33 have identical values, the differential output current of the Q49, Q50 pair once again becomes zero. Assuming capacitor C6 fully charges or discharges before the next input state change, differential output current pulses (the "pulse shaping signal") at the collectors of Q49 and Q50 will exhibit a constant duration. The pulse duration is determined by the values of bias currents I32 and I33, the input voltage swing, and the capacitance value of capacitor C6, while the polarity of the pulse is determined by the polarity of the input voltage change.

Load resistors R20 and R21 convert this differential output current pulses into a differential voltage signal appearing on nodes 130 and 132 at the output of the first stage. This differential voltage signal subsequently drives the second stage current switch (the gain stage) formed by transistors Q53 and Q54. The second stage current switch fully switches the programmable current I36 into current summing nodes 140 and 142 where they are added to primary signal path current and any other secondary signal path currents, thereby providing the desired pre-emphasis. In sum, the transient response of the switching secondary signal path 129 is a differential current pulse of fixed duration wherein the pulse magnitude is determined by the programmable bias current I36.

In switching secondary signal path 129, transistors Q53 and Q54 drive the current pulse generated by transistors Q49 and Q50 onto the summing nodes 140, 142. Resistors R22 and R23 are coupled to respective emitter terminals of transistors Q53 and Q54 and tail current source I36. In the present embodiment, tail current source I36 provides a programmable bias current through a programming signal from programmable gain control block 122. Tail current I36 determines the amplitude of the current pulse generated by the switching secondary signal path 129. Resistors R22 and R23 are used as ballast to reduce the effects of base-to-emitter voltage ($V_{BE}$) mismatches between transistors Q53 and Q54. Reducing $V_{BE}$ voltage mismatches between transistors Q53 and Q54 ensures that transistors Q53 and Q54 would split current I36 evenly. Resistors R22 and R23 typically have small resistance values, such that they do not prevent the complete switching of current I36.

Figure 13:
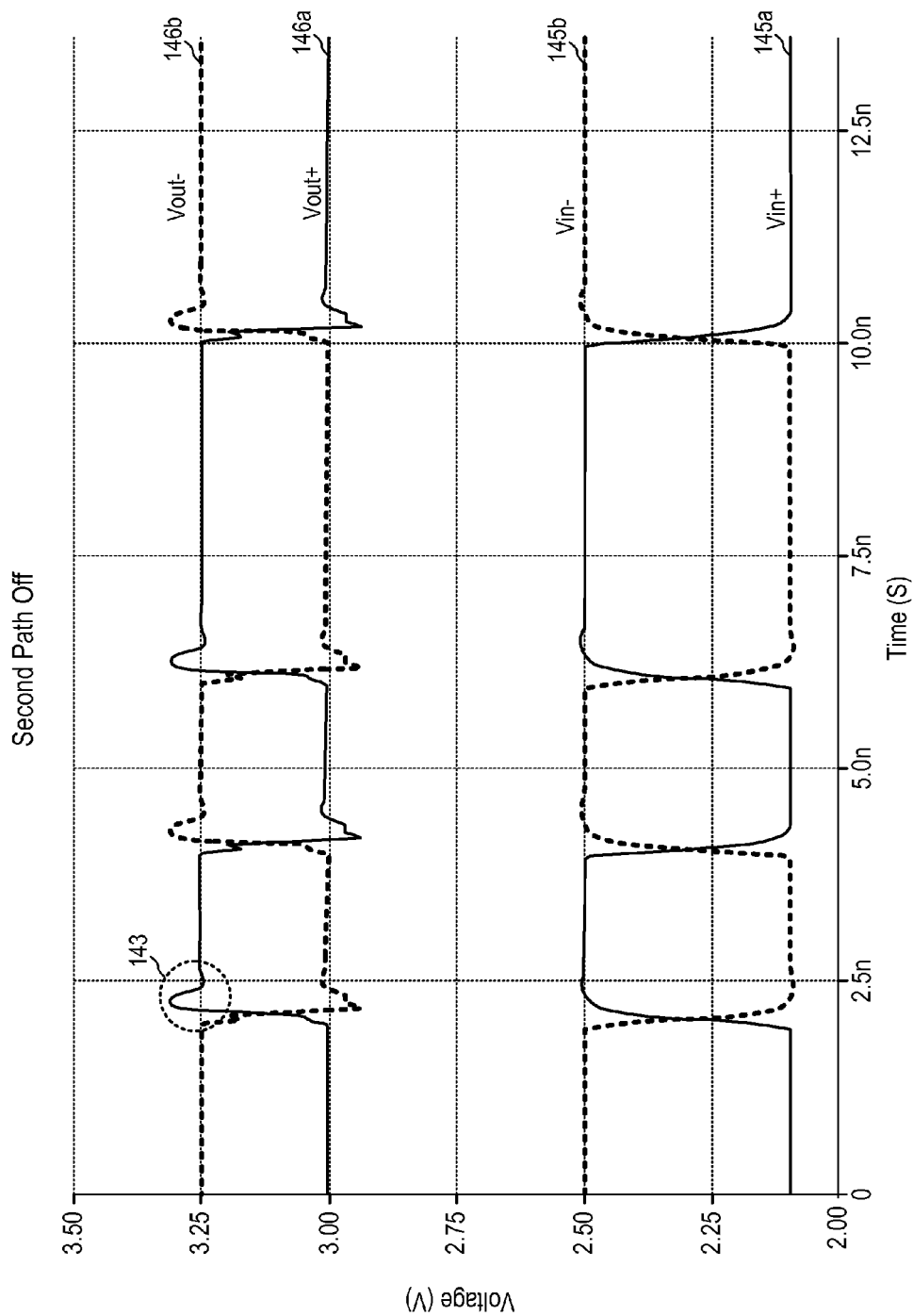
FIGS. 13-14 are waveform diagrams of signals in the pre-emphasis circuit of FIG. 12.
Figure 14:
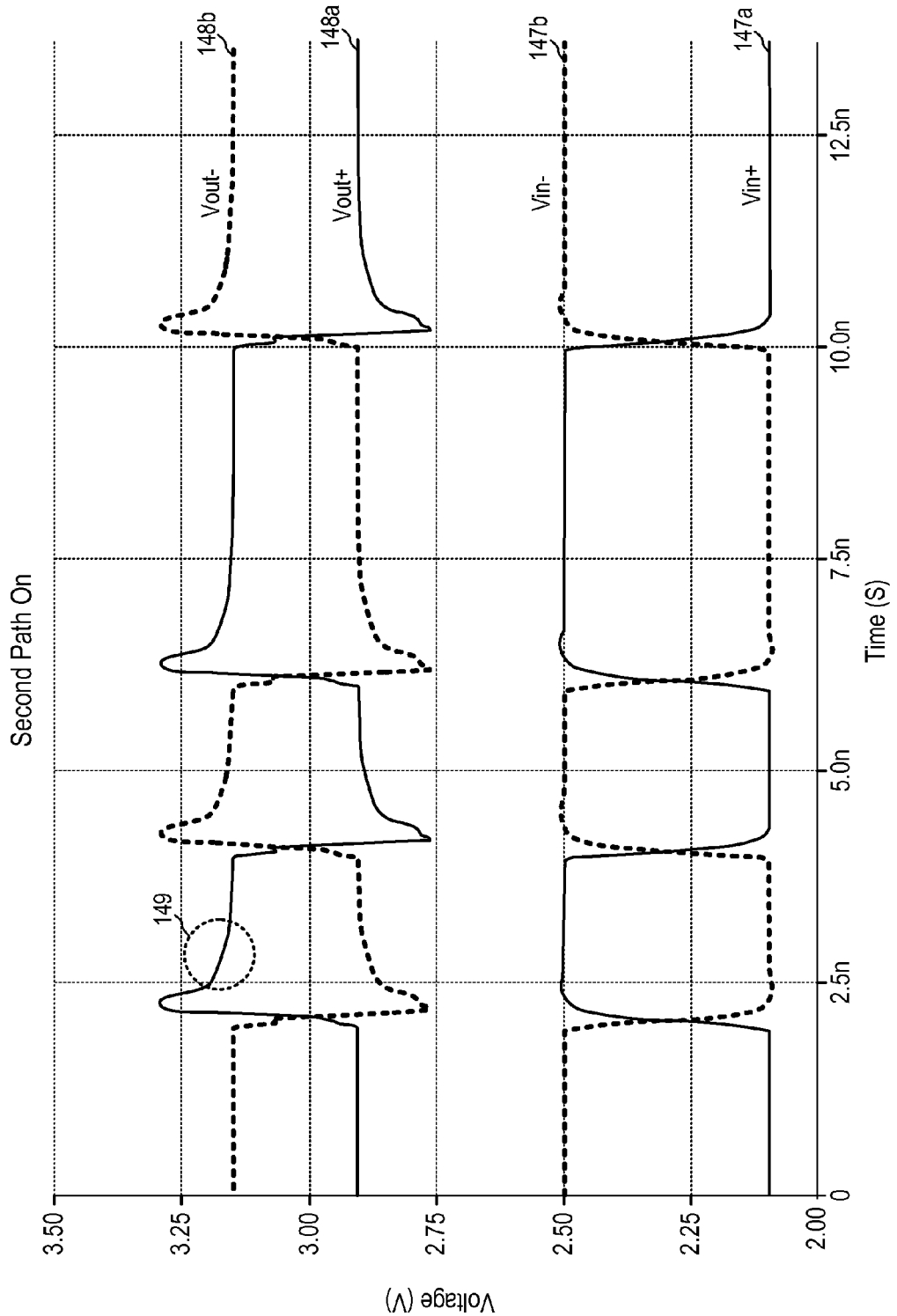

FIGS. 13-14 are waveform diagrams of signals in the pre-emphasis circuit of FIG. 12. FIGS. 13 and 14 both illustrate the differential input voltage Vin+, Vin− and the differential output voltage Vout+, Vout−. The differential input voltage Vin+, Vin− are the same in both figures. FIG. 13 illustrates the case when the secondary signal path 127 is turned off and FIG. 14 illustrates the case when the secondary signal path 127 is turned on. In the present description, the secondary signal paths 127 and 129 are described as being turned on and off. When a secondary signal path is turned off by reducing the programmable bias current to zero, that secondary signal path does not contribute any differential output current or transient response to the output signal. It is imperative to note that while the contribution from one or more of the secondary signal paths can be turned off and turned on, the contribution is also programmable when the signal path is turned on so that a desired amount or a desired amplitude of transient response from that signal path is added to the output signal.

Referring first to FIG. 13, the rising and falling edges of the differential input voltage Vin+, Vin− (curves 145a, 145b) are transferred to the differential output voltage Vout+, Vout− (curves 146a, 146b) with the controlled overshoot provided by the switching secondary signal path 129 only. The overshoot is in the form of a pulse (denoted by dotted circle 143) with the duration of the pulse or the pulse width determined by the capacitance value of capacitor C6, the input voltage swing and the bias currents I32 and I33. The amplitude of the overshoot pulse is determined by the tail current I36.

When the secondary signal path 127 is turned on (FIG. 14), initial overshoot magnitudes are seen to be greater relative to the overshoot magnitudes shown in FIG. 13. Furthermore, the secondary signal path 127 introduces an RC decaying exponential at the trailing edge (dotted circle 149) of the overshoot, realizing wave shaping of the overshoot. It is imperative to note that when secondary signal path 127 is turned on, the signal path introduces extra DC current to load resistors R27 and R28 as compared to the case when the signal path is turned off (FIG. 13). Therefore, the average DC voltage levels of the output voltages Vout+ and Vout− (curves 148a, 148b) in FIG. 14 both drop by about 100 mV as compared to the output voltage Vout+/Vout− (curves 146a, 146b) in FIG. 13. Note both drops are identical. Hence the desired output signal, which is the difference between Vout+ and Vout−, is not affected by this common mode DC shift. The DC bias level drop and the decaying exponential at the trailing edge of the overshoots are both characteristics illustrating the addition of signal currents from secondary signal path 127 to those of secondary signal path 129 and the primary signal path 125.

In pre-emphasis circuit 120 of FIG. 12 and also in the other pre-emphasis circuit described above, one or more of the secondary signal paths can be turned on or off as needed by reducing the programmable bias current to zero and the amplitude of the transient response of each enabled secondary signal paths is programmable so that the desired overshoot can be obtained for the output signal. More importantly, a pre-emphasis circuit of the present invention can be constructed with one or more secondary signal paths all formed in a single integrated circuit. A set of secondary signal paths each providing different transient responses, such as a fast response, a slower exponential response, a narrow pulse response, can be selected so that a pre-emphasis circuit formed on a single integrated circuit can be used to provide relatively optimum pre-emphasis for a class of transmission line applications. For example, a pre-emphasis circuit with a set of secondary signal paths formed on a single integrated circuit can be used for a range of lengths of PCB traces or cables of certain characteristics. The programming control of the secondary signal paths and the primary signal path fine tunes the resultant overshoot to achieve near optimum pre-emphasis results using a pre-emphasis circuit that can be built as a high volume, low cost, standard IC components.

In other embodiments of the present invention, any number of the programmable wave-shaping secondary signal paths, with the wave shaping stage first or last, can be mixed with any number of the programmable pulse shaping secondary signal path described above to form a pre-emphasis circuit providing the desired pre-emphasis transient responses. Thus, in other embodiments of the present invention, a transmission line pre-emphasis circuit can include a primary signal path and one or more of secondary signal paths selected from the collection of secondary signal paths described above. The collection of secondary signal paths include a secondary signal path having the wave shaping stage before the gain stage (as shown in FIGS. 1 and 6), a secondary signal path having the gain stage before the wave shaping stage (as shown in FIGS. 2 and 8), and a pulse shaping secondary signal path (as shown in FIG. 12). In some embodiments, a pre-emphasis circuit includes two or more pulse shaping secondary signal paths, each path with a different pulse width and programmable amplitude for the overshoot pulse so that a desired overshoot can be created as a result of combining the different overshoot pulses together. The selection and intermixing of the secondary signal paths provides flexibility in forming the transmission line pre-emphasis circuit so that the transmission line pre-emphasis circuit of the present invention can be readily adapted for a wide range of applications.

Figure 15:
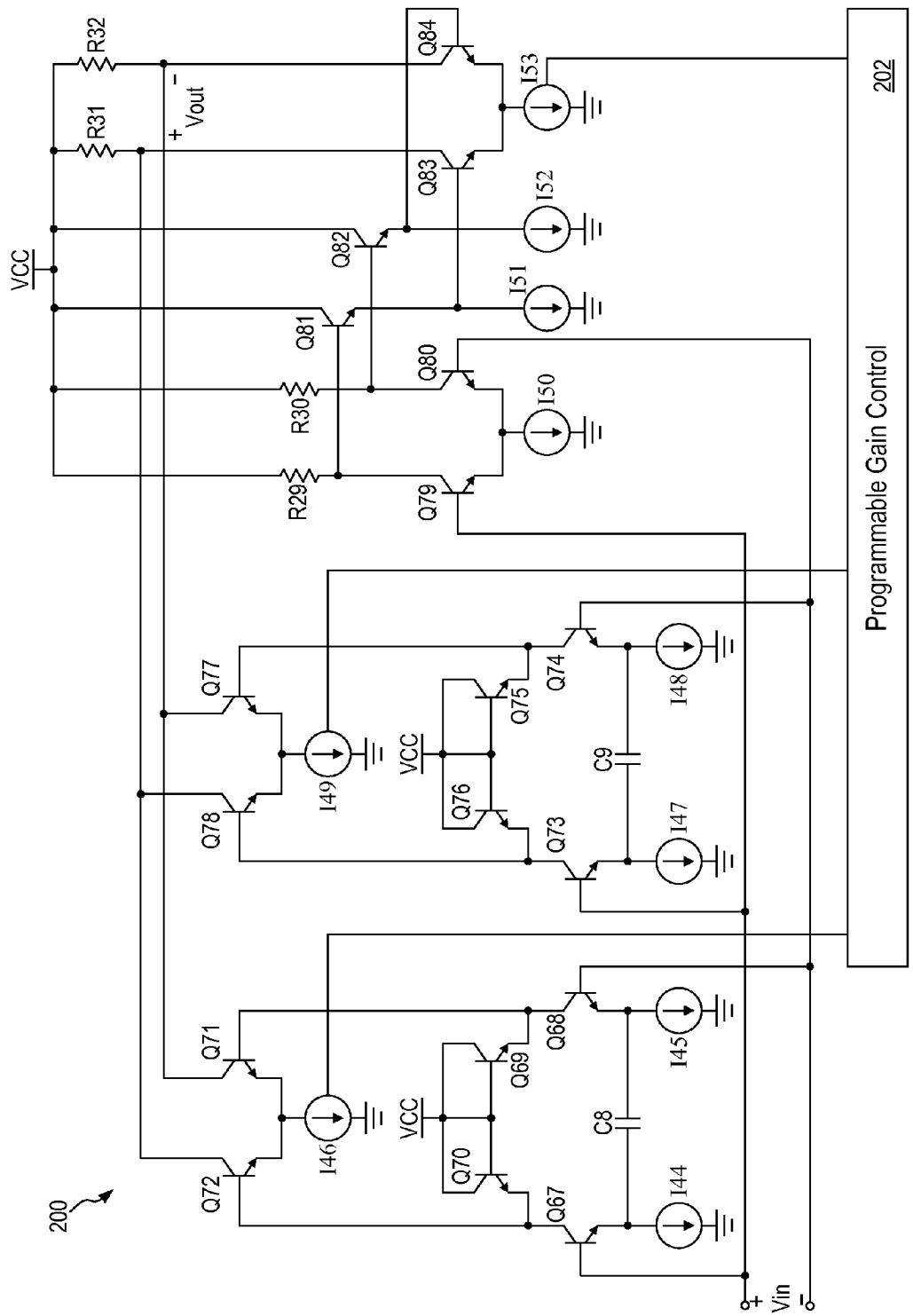
FIG. 15 is a transistor level circuit diagram of the transmission line pre-emphasis circuit incorporating two pulse shaping secondary signal paths according to one embodiment of the present invention.

FIG. 15 is a transistor level circuit diagram of the transmission line pre-emphasis circuit incorporating two pulse shaping secondary signal paths according to one embodiment of the present invention. Referring to FIG. 15, a pre-emphasis circuit 200 includes a first pulse shaping secondary signal path with a capacitor C8 as the pulse shaping network coupled to transistors Q67 and Q68 and a second pulse shaping secondary signal path with a capacitor C9 as the pulse shaping network coupled to transistors Q73 and Q74. The current pulses generated by the pulse shaping stage are coupled to a non-linear loading network formed by diode connected transistors Q69, Q70, Q75 and Q76 before being coupled to the gain stages (transistors Q71, Q72, Q77 and Q78). The bias currents 146 and 149 to the pulse shaping secondary signal paths are programmably adjusted to generate overshoot pulses having the desired amplitude. By using difference capacitance values for the pulse shaping network (capacitors C8 and C9), overshoot pulses having different pulse width can be generated. The combination of overshoot pulses of different pulse widths can be advantageously applied to provide the desired pre-emphasis in the output signal Vout.

Figure 16:
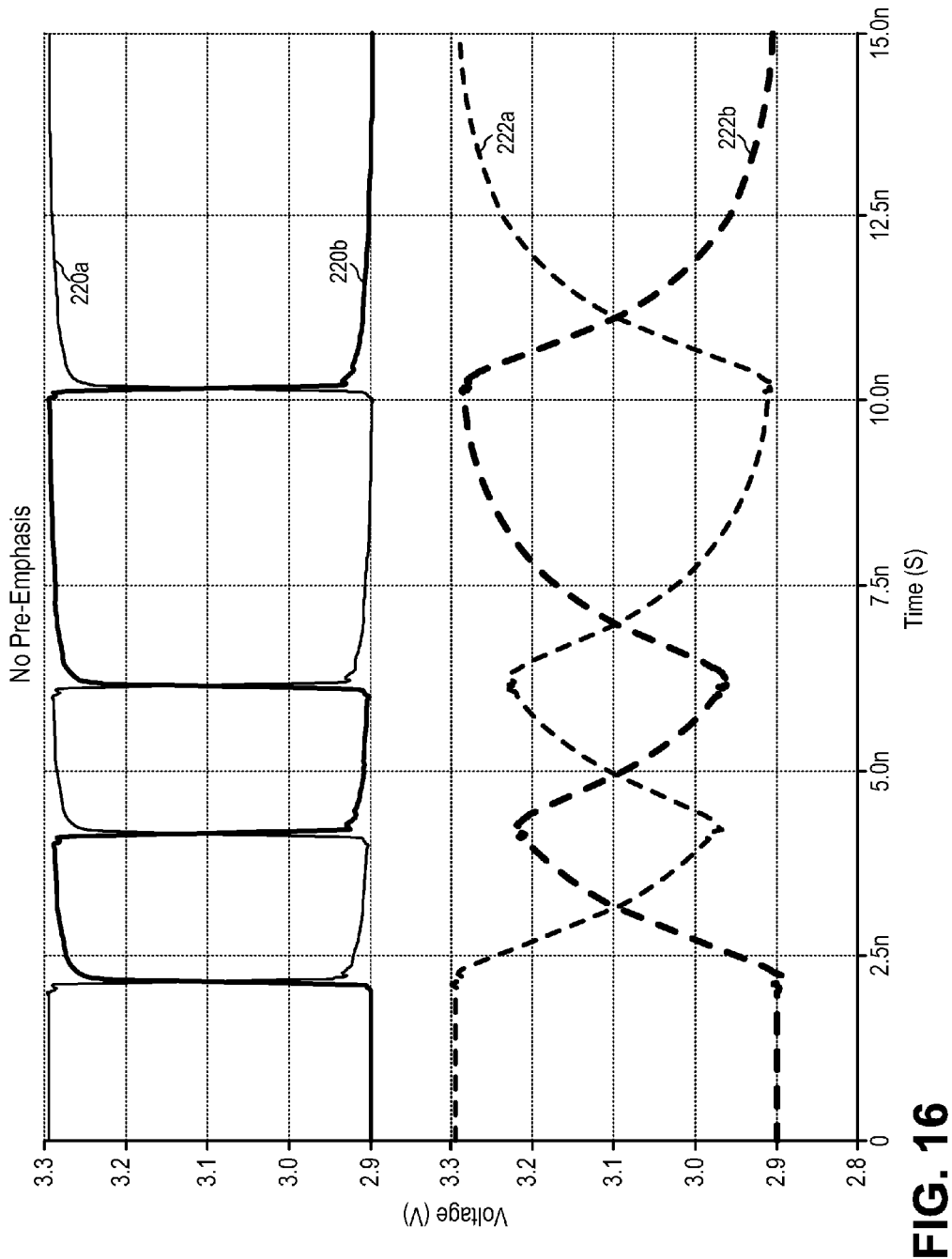
FIG. 16 is a waveform diagram of a digital data stream to be transmitted onto a hypothetical transmission line without pre-emphasis and the resulting signal at the receiver end of the hypothetical transmission line.

FIG. 16 is a waveform diagram of a digital data stream to be transmitted onto a hypothetical transmission line without pre-emphasis and the resulting signal at the receiver end of the hypothetical transmission line. The hypothetical transmission line is assumed to exhibit conventional transmission line loss characteristics where the response magnitude declines in a almost linear fashion as signal frequency increases. Referring to FIG. 16, curves 220a and 220b depict the differential signal waveform of the digital data stream at the transmitter end of the hypothetical transmission line. The differential signal have been properly amplified and exhibits clean signal transitions with no overshoots. However, when this signal reaches the receiver end of the transmission line (curves 222a and 222b), attenuation of the transmitted signal occurs to significantly alter the waveform shape of the received signal data stream. More specifically, while slow changing data patterns are able to maintain adequate signal magnitude, fast changing data patterns suffer from attenuation and loses much magnitude as a result of transmission line loss. The reduced amplitude of the fast changing data pattern makes it difficult for the receiver to correctly sense and detect the fast changing data pattern.

Figure 17:
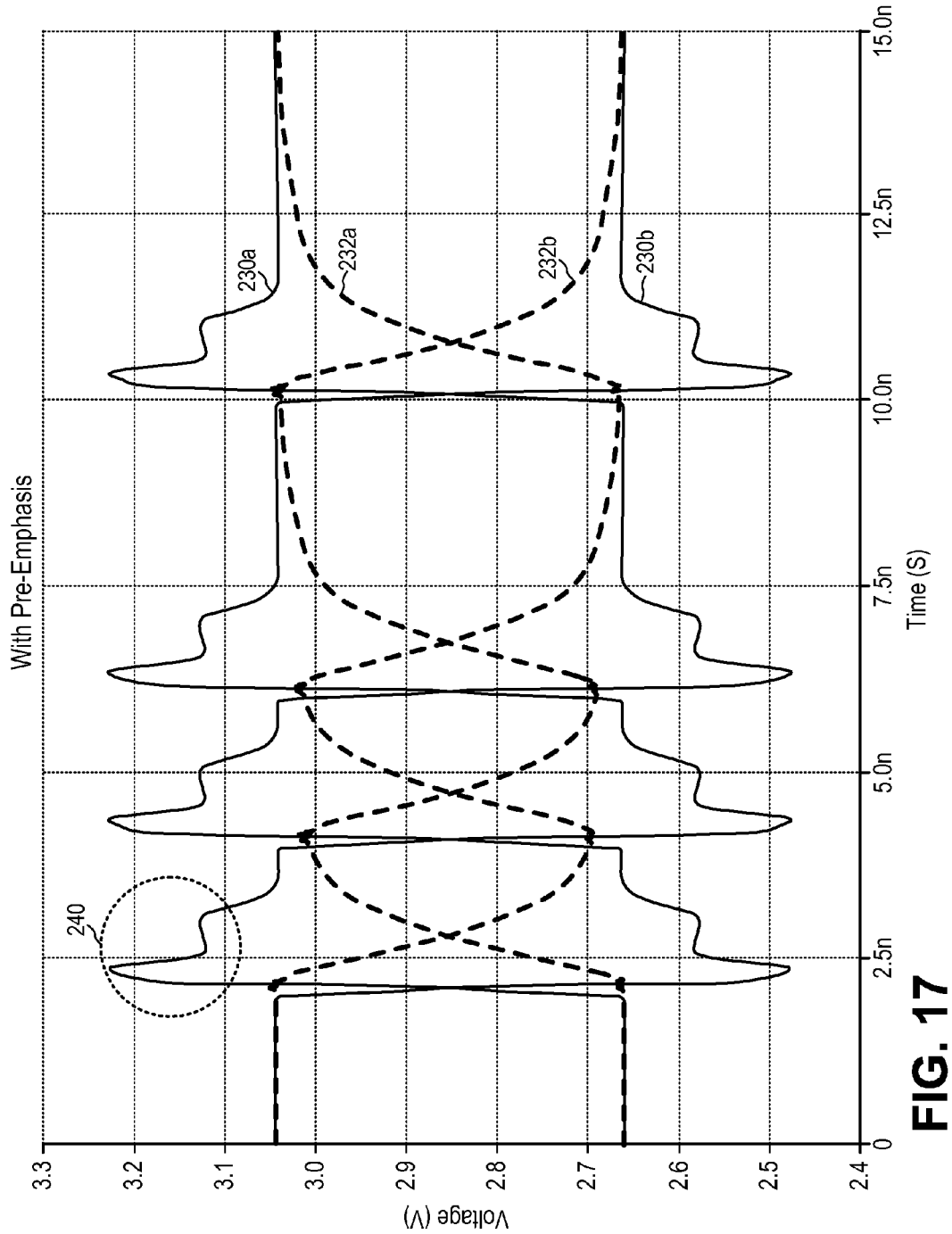
FIG. 17 is a waveform diagram of a digital data stream to be transmitted onto the hypothetical transmission line with the pre-emphasis of FIG. 15 applied and the resulting signal at the receiver end of the hypothetical transmission line according to one embodiment of the present invention.

FIG. 17 is a waveform diagram of a digital data stream to be transmitted onto the hypothetical transmission line with the pre-emphasis of FIG. 15 applied and the resulting signal at the receiver end of the hypothetical transmission line according to one embodiment of the present invention. Referring to FIG. 17, when the pre-emphasis circuit of FIG. 15 is applied, two overshoot pulses with different pulse widths are summed and added to the digital data stream to be transmitted. As a result of the combination of two overshoot pulses with different pulse widths, a staircase shaped controlled overshoot (dotted circle 240) is generated. The staircase shaped controlled overshoots mitigate the high frequency attenuation of the transmission line so that the digital data stream can be transmitted through to the receiver end (curves 232a and 232b) of the transmission line without loss of signal integrity. More specifically, curves 232a and 232b show that the signal magnitude for the fast changing data pattern is about the same as the signal magnitude of the slow changing data pattern, enabling reliable and accurate detection of the transmitted digital data stream.

It is also instructive to note that due to the filtering characteristics of the transmission line, the overshoots or steps appearing in the signal to be transmitted (curves 230a/230b) are completely smoothed out when the signal reaches the receiver end. Therefore, the particular shape of the controlled overshoot, whether a decaying exponential or a pulse or a staircase shaped overshoot, do not affect the final signal waveform shape at the receiver end but only acts to preserve signal magnitude especially for fast changing data patterns.

In the above described embodiments, the transmission line pre-emphasis circuit of the present invention is described as being constructed using bipolar transistors. In other embodiments, the transmission line pre-emphasis circuit of the present invention can be constructed using other semiconductor technologies, such as using MOS, CMOS, JFET and MESFET device technologies.

Furthermore, in the above described embodiments, the bias currents provided by the current sources driving the gain stages of the primary or secondary signal paths are shown to be programmable. In other embodiments, one or more of the bias currents may be fixed or programmable. When the bias current is fixed, the amplitude or the current gain of the secondary signal path output current, and thus the transient response, will become fixed. When the bias current is programmable, relative proportions of the transient response from that secondary signal path can be selected to give the desired transient response in the output voltage signal of the pre-emphasis circuit.

The above detailed descriptions are provided to illustrate specific embodiments of the present invention and are not intended to be limiting. Numerous modifications and variations within the scope of the present invention are possible. The present invention is defined by the appended claims.

We claim:

1. A transmission line pre-emphasis circuit, comprising:
   a primary signal path coupled to receive a digital data stream to be transmitted and provide a primary output current indicative of the digital data stream to a pair of current summing nodes;
   one or more secondary signal paths each incorporating a network implementing a specific transient response, the one or more secondary signal paths receiving the digital data stream and generating secondary output currents representing one or more overshoot signals indicative of the transient response of the respective network and synchronized with transitions of the digital data stream, the one or more secondary signal paths having variable gain programmed through respective DC programming signals, the secondary output currents being coupled to the pair of current summing nodes to be summed with the primary output current of the primary signal path; and
   an output loading stage coupled to the current summing nodes to generate a pre-emphasized digital output signal to be transmitted onto a transmission line indicative of the one or more overshoot signals added to the digital data stream.

2. The transmission line pre-emphasis circuit of claim 1, wherein the primary signal path has a variable gain programmed through a DC programming signal.

3. The transmission line pre-emphasis circuit of claim 1, wherein the primary signal path comprises:
   a differential digital driver receiving the digital data stream and generating output signals indicative of the digital data stream with a given delay; and
   a current switch receiving the output signals from the differential digital driver and driving the primary output current indicative of the digital data stream with the given delay onto the current summing nodes.

4. The transmission line pre-emphasis circuit of claim 3, wherein the differential digital driver comprises a digital buffer and the current switch comprises a differential transconductance amplifier.

5. The transmission line pre-emphasis circuit of claim 4, wherein the primary signal path has a variable gain programmed through a DC programming signal and wherein the current switch comprises a variable gain differential transconductance amplifier, the DC programming signal varying a DC bias current supplied to the variable gain transconductance amplifier to vary the gain of the current switch.

6. The transmission line pre-emphasis circuit of claim 3, wherein the given delay provided by the differential digital driver matches a delay of the overshoot signals through the one or more secondary signal paths.

7. The transmission line pre-emphasis circuit of claim 1, wherein a first one of the one or more secondary signal paths comprises:
- a first stage amplifier incorporating a network implementing the specific transient response, the first stage amplifier having a pair of differential input terminals receiving the digital data stream and generating a first stage differential output current on a pair of differential output nodes, the first stage differential output current having a transient response indicative of the digital data stream voltage being applied to the network; and
- a second stage amplifier having a pair of differential input terminals receiving the first stage differential output current and a pair of differential output terminals generating the secondary output current, the secondary output current being coupled to the pair of current summing nodes, the second stage amplifier having variable gain being set by a respective DC programming signal.

8. The transmission line pre-emphasis circuit of claim 7, wherein the first stage amplifier comprises a differential transconductance amplifier and the second stage amplifier comprises a variable gain current amplifier, the DC programming signal varying a DC bias current supplied to the variable gain current amplifier to vary the gain of the second stage amplifier.

9. The transmission line pre-emphasis circuit of claim 1, wherein a second one of the one or more secondary signal paths comprises:
- a first stage amplifier having a pair of differential input terminals receiving the digital data stream and a pair of differential output terminals generating a first stage differential output voltage, the first stage amplifier having variable gain being set by a respective DC programming signal, the first stage differential output voltage being indicative of an amplified voltage signal representative of the digital data stream; and
- a second stage amplifier incorporating a network implementing the specific transient response, the second stage amplifier having a pair of differential input terminals receiving the first stage differential output voltage and generating the secondary output current, the secondary output current having a transient response indicative of the amplified voltage signal being applied to the network, the secondary output current being coupled to the pair of current summing nodes.

10. The transmission line pre-emphasis circuit of claim 9, wherein the first stage amplifier comprises a variable gain linear voltage amplifier, the DC programming signal varying a DC bias current supplied to the variable gain linear voltage amplifier to vary the gain of the first stage amplifier, and the second stage amplifier comprises a differential transconductance amplifier.

11. The transmission line pre-emphasis circuit of claim 1, wherein a third one of the one or more secondary signal paths comprises:
- a first stage amplifier incorporating a network implementing a transient response being a fixed width pulse, the first stage amplifier operative to generate first stage differential output current pulses being converted to a first stage differential output voltage signal at a load circuit; and
- a second stage amplifier having a pair of differential input terminals receiving the first stage differential output voltage signal and a pair of differential output terminals generating a secondary output current as an overshoot pulse, the secondary output current being coupled to the pair of current summing nodes, the second stage amplifier having variable gain being set by a respective DC programming signal,
wherein the overshoot pulse generated at the second stage amplifier is summed with the primary output current to generate the pre-emphasized digital output signal having the overshoot pulse synchronized with transitions of the digital data stream.

12. The transmission line pre-emphasis circuit of claim 11, wherein the second stage amplifier comprises a differential pair formed by first and second bipolar transistors, a first resistor being coupled to an emitter terminal of the first bipolar transistor and a tail current and a second resistor being coupled to an emitter terminal of the second bipolar transistor and the tail current, the first and second resistors having the same resistance values.

13. The transmission line pre-emphasis circuit of claim 11, wherein the network comprises a capacitor, a pulse width of the overshoot pulse being determined at least by the capacitance of the capacitor.

14. The transmission line pre-emphasis circuit of claim 1, wherein the one or more secondary signal paths each realizes a unique transient response selected from one of a transient response with a given time constant and an overshoot pulse.

15. The transmission line pre-emphasis circuit of claim 14, wherein a secondary signal path realizes a transient response with a given time constant using a network comprising a resistor and a capacitor connected in series, the resistance of the resistor and the capacitance of the capacitor determining the time constant of the transient response.

16. The transmission line pre-emphasis circuit of claim 14, wherein a secondary signal path realizes an overshoot pulse using a network comprising a capacitor, a pulse width of the overshoot pulse being determined at least by the capacitance of the capacitor.

17. The transmission line pre-emphasis circuit of claim 1, wherein the digital data stream and the pre-emphasized digital output signal comprise differential signals.

18. A method for introducing pre-emphasis to a digital data stream being transmitted over a transmission line, the method comprising:
- generating a primary output current indicative of the digital data stream;
- applying the digital data stream to one or more networks, each network having a specific transient response;
- generating secondary output currents representing one or more overshoot signals indicative of the transient response of the respective network and synchronized with transitions of the digital data stream;
- adjusting a gain of the secondary output currents through one or more DC programming signals;
- summing the primary output current with the secondary output current representing the one or more overshoot signals; and
- generating a pre-emphasized digital output signal to be transmitted onto a transmission line based on the summed current, the pre-emphasized digital output signal being indicative of the one or more overshoot signals added to the digital data stream.

19. The method of claim 18, further comprising:
- adjusting a gain of the primary output current through a DC programming signal.

20. The method of claim 19, wherein generating a primary output current indicative of the digital data stream comprises generating a primary output current indicative of the digital data stream using a differential digital buffer and adjusting a gain of the primary output current through a DC programming signal comprises adjusting a DC bias current provided to the differential digital buffer.

21. The method of claim 18, wherein generating one or more overshoot signals comprises generating one or more overshoot signals using a differential transconductance amplifier and adjusting a gain of the one or more wave shaping signals or overshoots comprises adjusting a DC bias current provided to the differential transconductance amplifier.

22. The method of claim 18, wherein applying the digital data stream to one or more networks comprises applying the digital data stream to one or more networks, each network having a unique response selected from one of a transient response with a given time constant and an overshoot pulse.

* * * * *